(12) United States Patent
Cote

(10) Patent No.: US 11,589,560 B2
(45) Date of Patent: Feb. 28, 2023

(54) BIRD FEEDER

(71) Applicant: BROME BIRD CARE INC., Knowlton (CA)

(72) Inventor: Paul L. Cote, Knowlton (CA)

( * ) Notice: Subject to any disclaimer, the term of this patent is extended or adjusted under 35 U.S.C. 154(b) by 0 days.

(21) Appl. No.: 17/126,615

(22) Filed: Dec. 18, 2020

(65) Prior Publication Data

US 2021/0185989 A1 Jun. 24, 2021

Related U.S. Application Data

(60) Provisional application No. 62/949,949, filed on Dec. 18, 2019.

(51) Int. Cl.
*A01K 39/01* (2006.01)
*A01K 39/012* (2006.01)

(52) U.S. Cl.
CPC ........ *A01K 39/012* (2013.01); *A01K 39/0113* (2013.01)

(58) Field of Classification Search
CPC .......................... A01K 39/012; A01K 39/0113
See application file for complete search history.

(56) References Cited

U.S. PATENT DOCUMENTS

| | | | |
|---|---|---|---|
| 5,207,181 A * | 5/1993 | Loken | A01K 39/0113 119/52.3 |
| 7,191,731 B2 | 3/2007 | Cote | |
| 8,522,717 B2 * | 9/2013 | Carter | A01K 39/026 119/72 |
| 9,526,232 B2 * | 12/2016 | Cote | A01K 39/012 |
| 2002/0139311 A1 * | 10/2002 | Cote | A01K 39/0113 119/57.9 |
| 2003/0226514 A1 * | 12/2003 | Cote | A01K 39/0113 119/57.9 |
| 2005/0263083 A1 * | 12/2005 | Coroneos | A01K 39/0113 119/57.1 |
| 2007/0169705 A1 * | 7/2007 | Cote | A01K 39/0113 119/52.3 |
| 2007/0227453 A1 * | 10/2007 | Puckett | A01K 39/012 119/57.8 |
| 2011/0083610 A1 * | 4/2011 | Cote | A01K 39/0113 119/52.3 |
| 2011/0126771 A1 * | 6/2011 | Cote | A01K 39/012 119/52.3 |
| 2015/0296750 A1 * | 10/2015 | Cote | A01K 39/0113 119/57.8 |
| 2016/0262357 A1 * | 9/2016 | Cole | A01K 39/014 |
| 2019/0159432 A1 * | 5/2019 | Bruno | A01K 39/0125 |
| 2019/0313608 A1 * | 10/2019 | Cote | A01K 39/012 |

* cited by examiner

*Primary Examiner* — Monica L Perry
(74) *Attorney, Agent, or Firm* — Andrews Robichaud P.C.

(57) ABSTRACT

The present disclosure provides a bird feeder moveable from a first position to a second position. The bird feeder is preferably comprised of a seed tube for holding a substance, a seed tray having openings to receive and provide access to the substance, a shroud surrounding and protecting both the seed tube and seed tray and a cover secured to an upper end of the shroud. The bird feeder is also preferably comprised of a positioning mechanism to move the bird feeder from the first position, where access to the substance is provided, and the second position, where access to the substance is prevented.

20 Claims, 24 Drawing Sheets

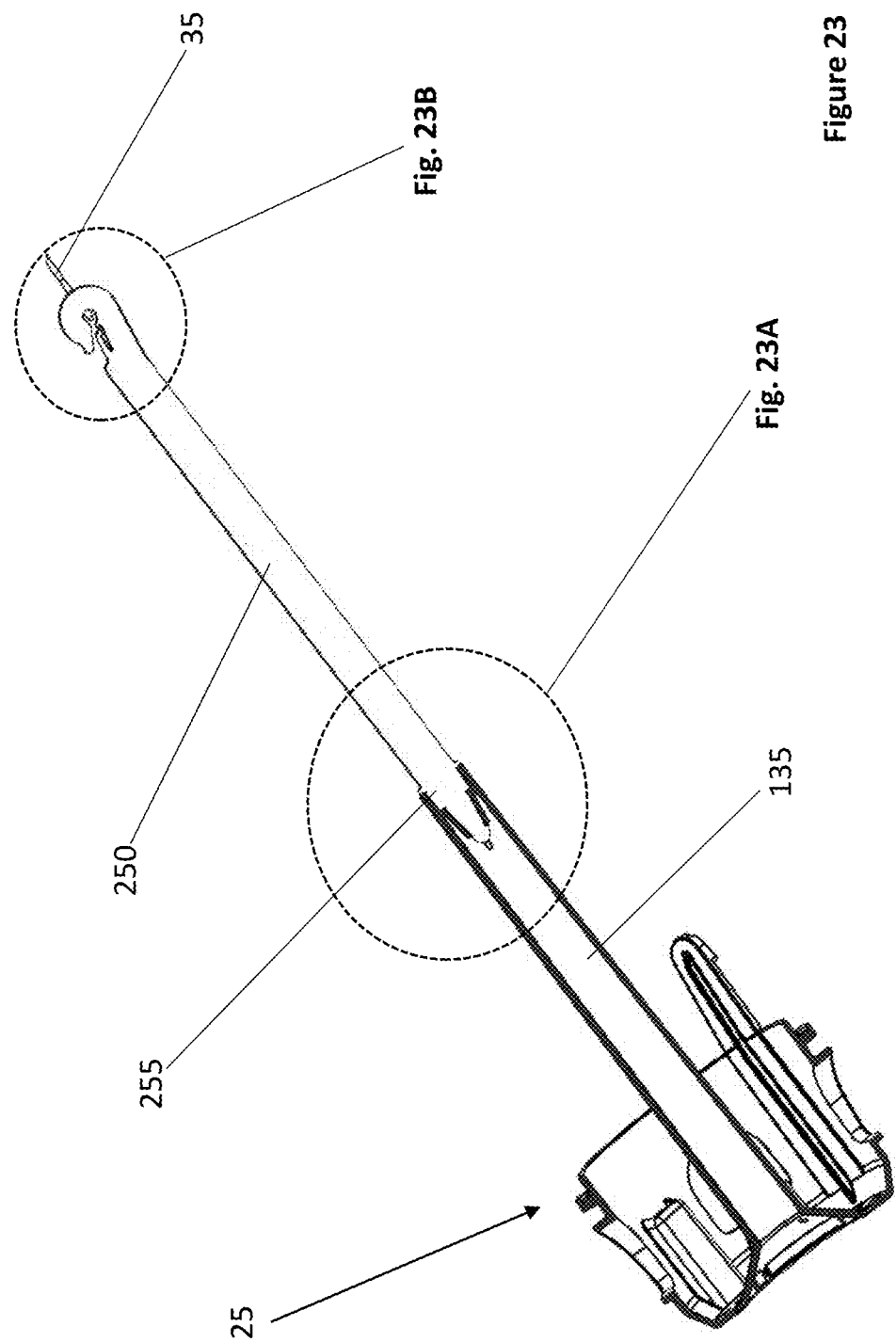

BIRD FEEDER

FIELD

The disclosure relates to the field of bird feeding accessories, and more specifically to an improved bird feeder.

BACKGROUND

Bird feeders have been around for quite some time for bird watchers and animal lovers. However, many problems exist with current bird feeders, including but not limited to water or other moisture accumulating into the feeder and poor ventilation unable to properly dry the feed.

Further, many bird feeders are comprised of bulky singular elements that are difficult to take apart for cleaning, which is necessary to provide clean feed for birds.

Devices such as U.S. Pat. No. 7,191,731 have attempted to overcome some of the problems by providing shrouds to reduce wear on the feed tubes, the shrouds moveable from a position to another to allow or prevent access to feed. However, such devices are more difficult to take apart and clean, and do not provide the requisite ventilation necessary for the seeds to remain fresh.

As such, there is a need for a novel type of bird feeder that can overcome the problems of the prior art.

SUMMARY

In an aspect, the present disclosures provides a bird feeder comprising: a seed tube for holding bird feed; a seed tray connected to the seed tube, the seed tray for receiving and dispensing the bird feed, the seed tray further comprising at least one feed opening to dispense the bird feed; a shroud surrounding the seed tube to protect the seed tube; and, a cover releasably secured to an upper end of the shroud, the cover to prevent objects from entering the seed tube, wherein the shroud is moveable from a first position providing access to the at least one feed opening to a second position preventing access to the at least one feed opening.

BRIEF DESCRIPTION OF THE DRAWINGS

The following figures serve to illustrate various embodiments of features of the disclosure. These figures are illustrative and are not intended to be limiting.

FIG. 17A is an enlarged perspective view of the rod in contact with the spring cap taken within the lines of FIG. 17, according to an embodiment of the present disclosure;

DETAILED DESCRIPTION

The following embodiments are merely illustrative and are not intended to be limiting. It will be appreciated that various modifications and/or alterations to the embodiments described herein may be made without departing from the disclosure and any modifications and/or alterations are within the scope of the contemplated disclosure.

Figure 1:
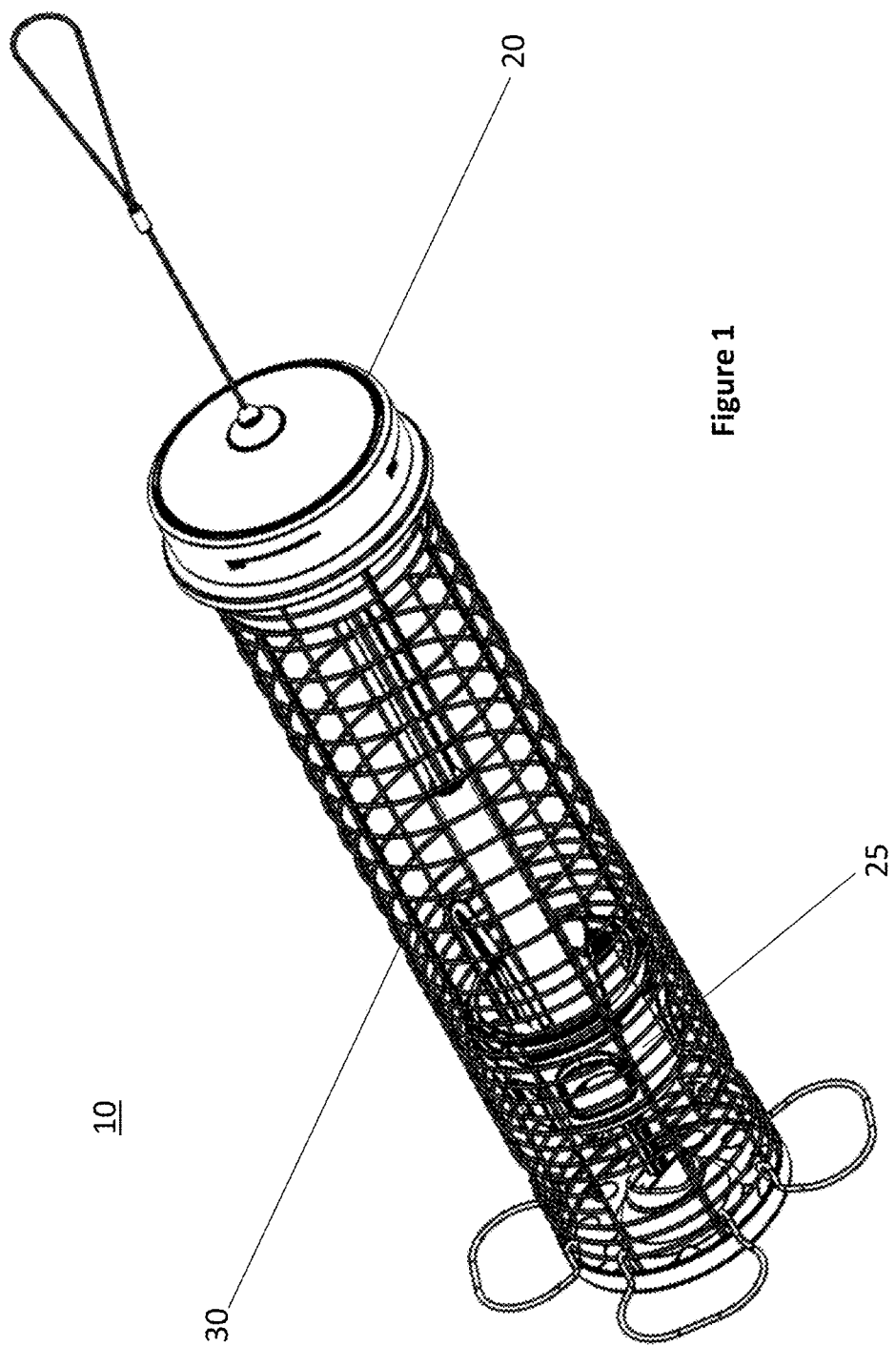
FIG. 1 is a perspective view of an improved bird feeder, according to an embodiment of the present disclosure.
Figure 2:
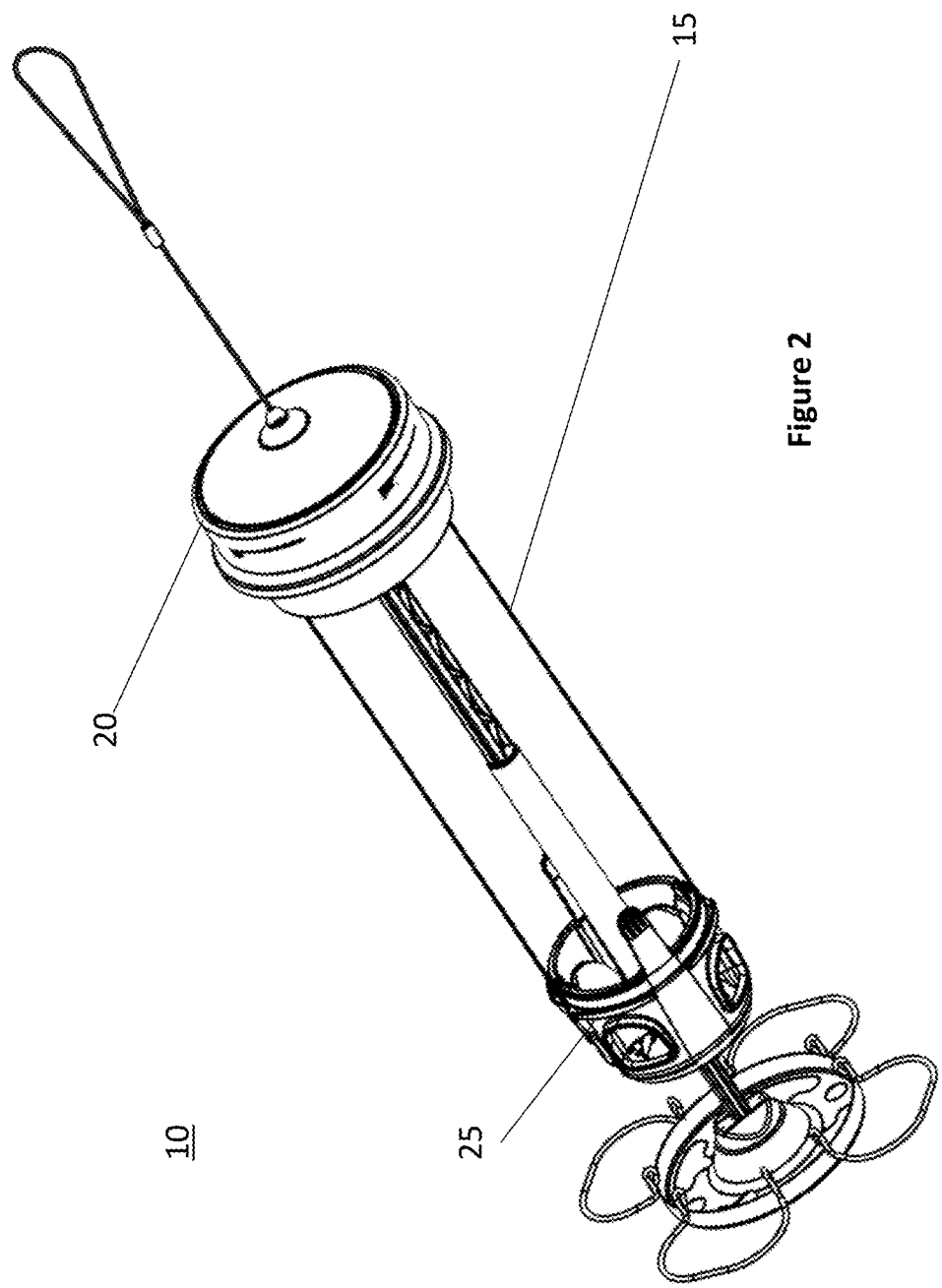
FIG. 2 is a perspective view of the improved bird feeder without a shroud, according to an embodiment of the present disclosure.
Figure 3:
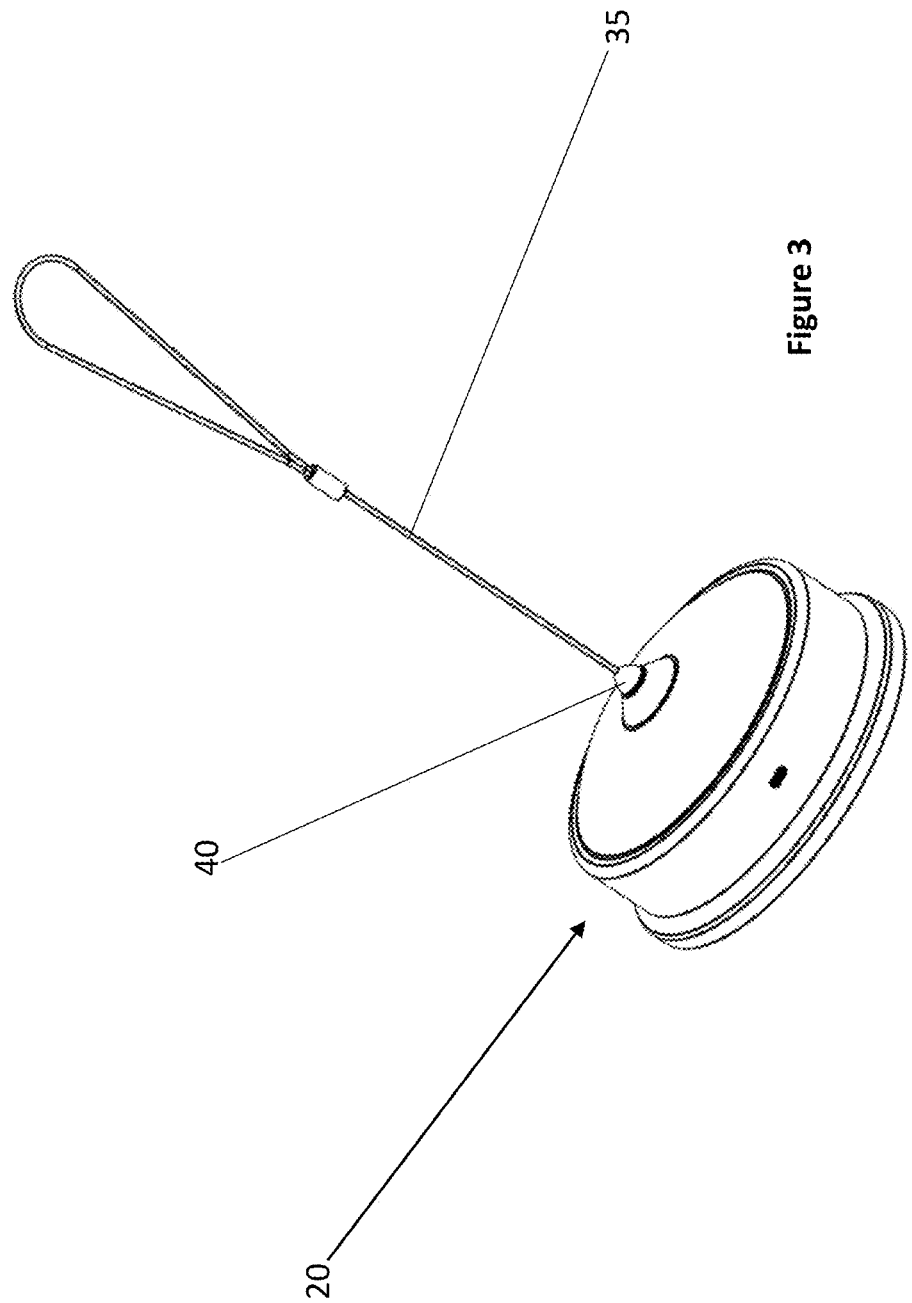
FIG. 3 is a perspective view of a cover with a wire of the improved bird feeder, according to an embodiment of the present disclosure.
Figure 4:
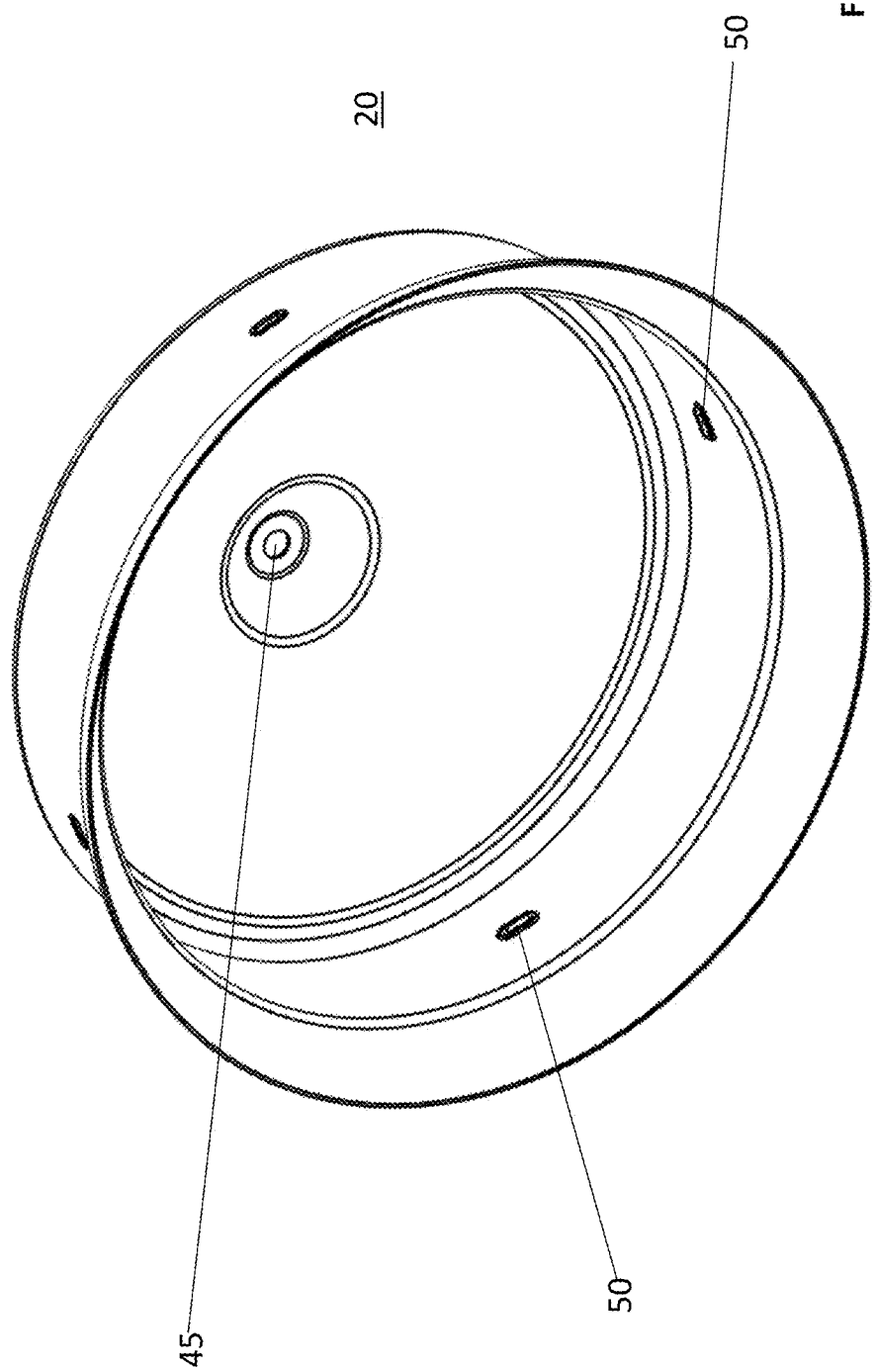
FIG. 4 is an underside perspective view of a cover of the improved bird feeder, according to an embodiment of the present disclosure.

With reference to FIGS. 1 and 2 and according to an embodiment of the present disclosure, an improved bird feeder is shown, preferably comprised of a seed tube 15 for receiving and containing bird feed, a seed tray 25 connected to the seed tube 15 for receiving and dispensing bird feed, a shroud 30 surrounding the seed tube 15, the shroud 30 to allow and prevent access to both the seed tray 25 and seed tube 15, and a cover 20 releasably secured to the shroud 30 for preventing water and other particles from entering the seed tube 15 and further into the seed tray 25.

Figure 5:
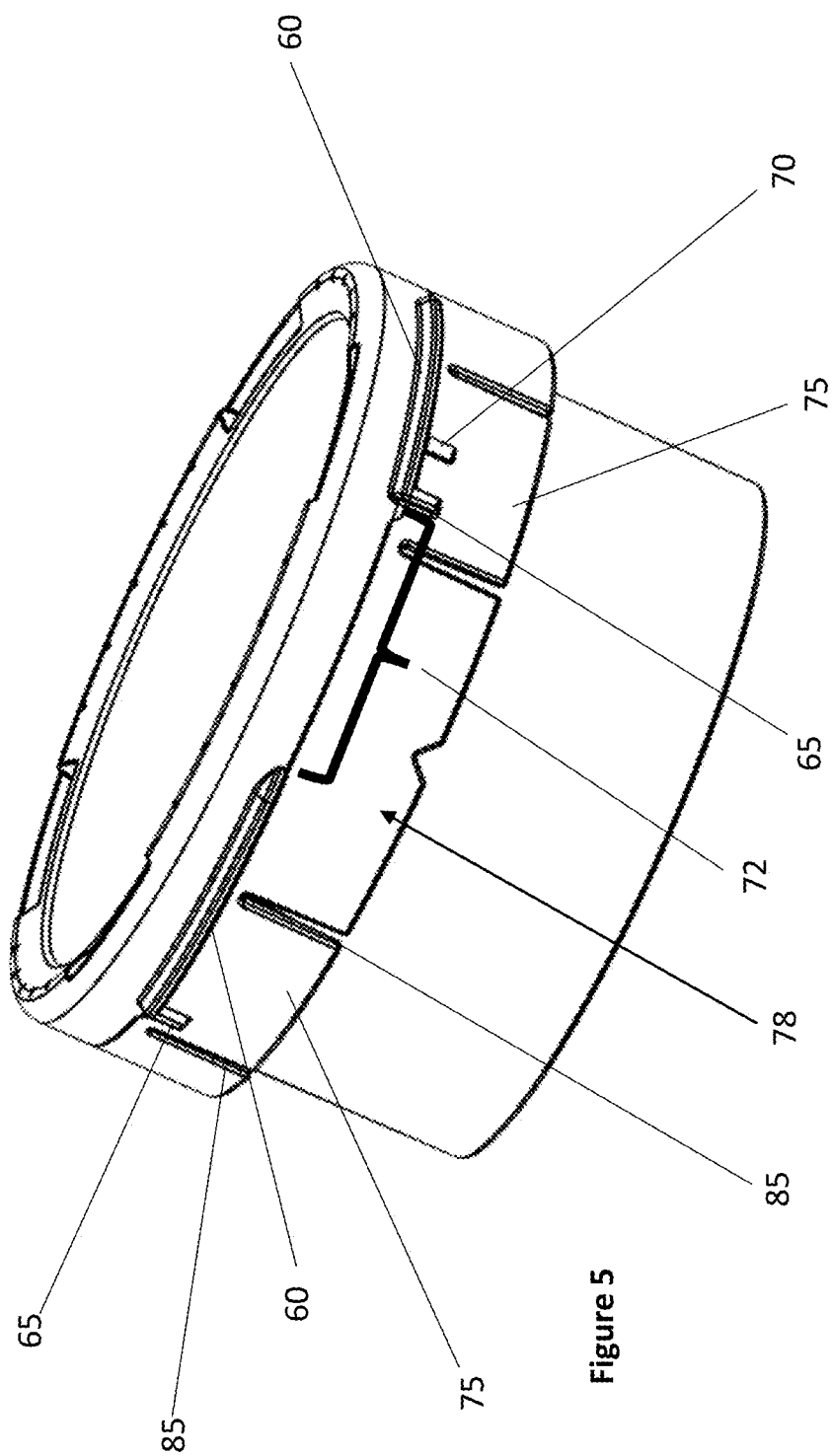
FIG. 5 is a perspective view of a top ring of the improved bird feeder, according to an embodiment of the present disclosure.

With reference to FIGS. 3, 4, 5 and 6 and according to an embodiment of the present disclosure, the cover 20 is shown in greater detail. The cover 20 serves to deflect rain and other debris from entering the seed tube (not shown) of the bird feeder. The cover 20 also prevents squirrels from entering the seed tube (not shown) and gain access to the seed tray (not shown). Although the cover 20 is preferably cylindrical in shape, other shapes are possible provided that the cover 20 generally deflects rain and prevents debris and squirrels from entering both the seed tube (not shown) and seed tray (not shown). The cover 20 is further comprised of a wire 35 preferably having a first loop at a first end to secure the bird feeder to a structure, such as a column having an arm (not shown). The wire 35 also has a second loop (not shown) at a second opposed end (not shown) to secure the wire 35 to a hook shaft (not shown) of the bird feeder. As shown, the wire 35 is fed through a small hole 45 of the cover 20. As such, a cable seal 40 is provided, the cable seal 40 wrapped around the wire 35 and positioned over the hole 45 of the cover 20. The cable seal 40 is preferably made of a rubber material and serves to prevent rain and other debris from entering the hole 45. A worker skilled in the art would appreciate that the cable seal 40 could be made of other materials and be of various shapes and sizes, provided that the cable seal 40 generally prevents rain and other debris from entering the hole 45. The cover 20 is further comprised of indentations 50 positioned on an inside surface of the cover 20. Although the present bird feeder provides for four indentations 50, a worker skilled in the art would appreciate that only two indentations 50 are required. Such indentations 50 serve to releasably secure the cover 20 to an upper ring 55 of the shroud (not shown). Indeed, the upper ring 55, which is specifically shown in FIG. 5, is further comprised of guides 60, each of the guides 60 terminating in a wall 65. At least one of the guides 60 is further comprised of a locking tab 70. To secure the cover 20 to the upper ring 55, the indentations 50 are aligned with gaps 72 created in between adjacent guides 60. The cover 20 is then rotated such that the indentations 50 slide along the guides 60 and over the locking tab 70. The indentations 50 are then trapped in the area in between the locking tabs 70 and the walls 65, at which point the cover 20 is secured to the upper ring 55. In turn, the upper ring 55 is itself attached to and therefore part of the shroud (not shown). To unlock the cover 20 from the upper ring 55, the cover 20 is rotated in the opposite direction.

The indentations 50 will slide along the guides 60 and a stronger rotational force will force the indentations 50 over the locking tabs 70. Once the indentations 50 are positioned in between gaps 72, the cover 20 can be removed from the upper ring 55. A worker skilled in the art would appreciate that although the present bird feeder uses guides 60 having a wall 65 and some of the guides 60 having locking tabs 70, other locking mechanisms are possible. Specifically, the cover 20 may be removably secured to the top ring 55 by threaded engagement, or even by replacing the wall 65 and locking tab 70 with a cavity to receive the indentations 50.

Figure 6:
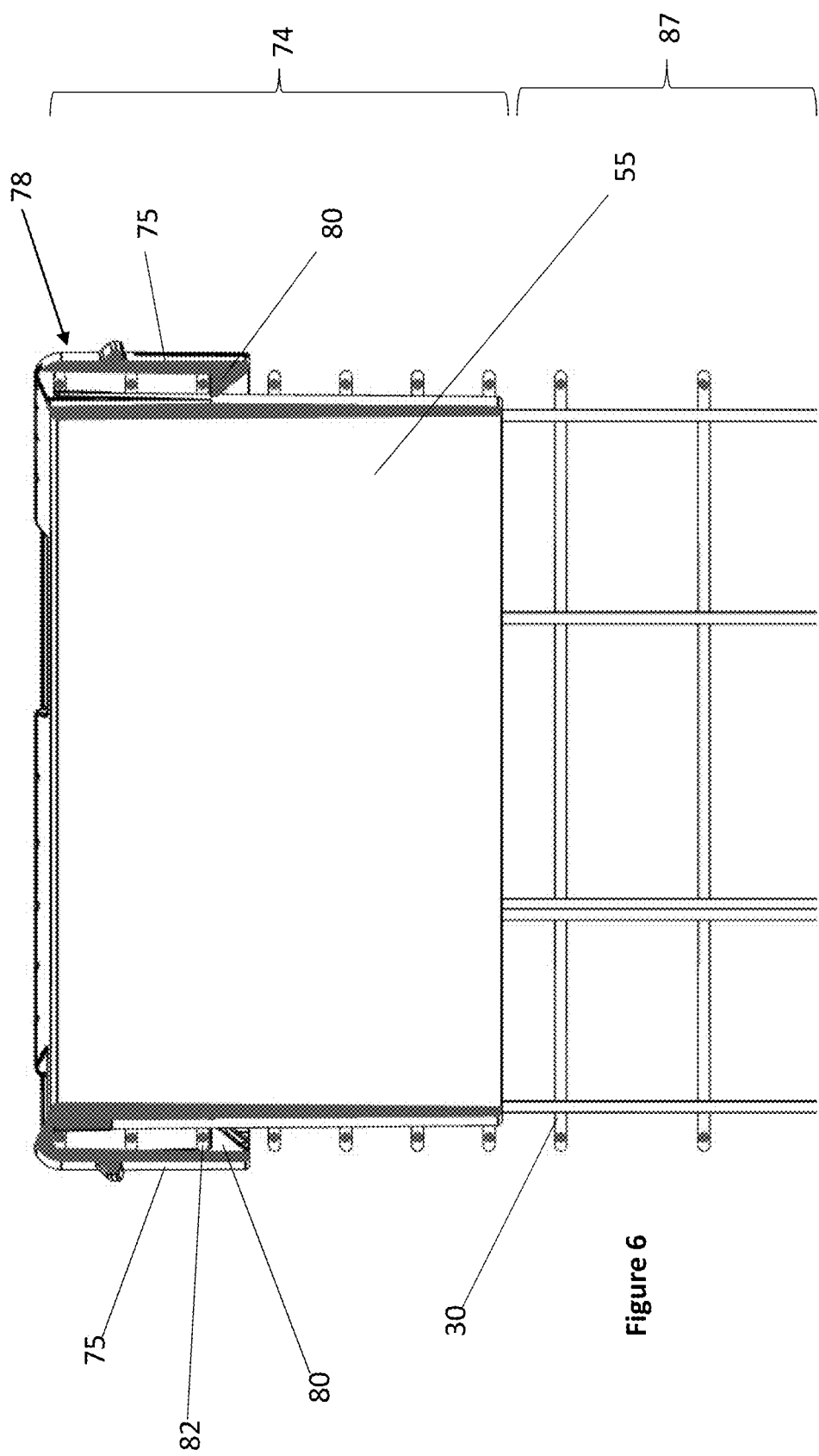
FIG. 6 is a cross-sectional side view of a shroud with the top ring of the improved bird feeder, according to an embodiment of the present disclosure.

With specific reference to FIGS. 5 and 6 and according to an embodiment of the present disclosure, the top ring 55 is shown secured to the upper end 74 of the shroud 30. Indeed, the top ring 55 is further comprised of tabs 75 positioned on an outer rim 78 of the top ring 55. Although four tabs 75 are present, a worker skilled in the art would appreciate that only two tabs 75 are required. At least one catch 80 is positioned on the underside of each tab 75. Each catch 80 is constructed to slide over and hook into one of the rings 82 of the shroud 30. As the tabs 75 are separated by a pair of slits 85, they have the requisite flexibility to pivot and allow the catches 82 to slide over and lock into the ring 82. As shown, the spaces in between the number of adjacent rings 82 decreases at the upper end 74 of the shroud 30. In other words, adjacent rings 82 are spaced apart closer together at the upper end 74 of the shroud 30 as opposed to the mid-section 87 of the shroud 30 to protect the top ring 55. Such closely spaced apart rings 82 are also provided at a lower end of the shroud 30 to protect the seed tray (not shown). Indeed, it was shown through testing that squirrels often cause damage to upper and lower ends of the shroud to gain access to the seed tray (not shown). As such, it is an objective of the present disclosure to provides closely spaced apart rings on the upper and lower ends of the shroud 30 to reduce or otherwise eliminate this damage.

Figure 7:
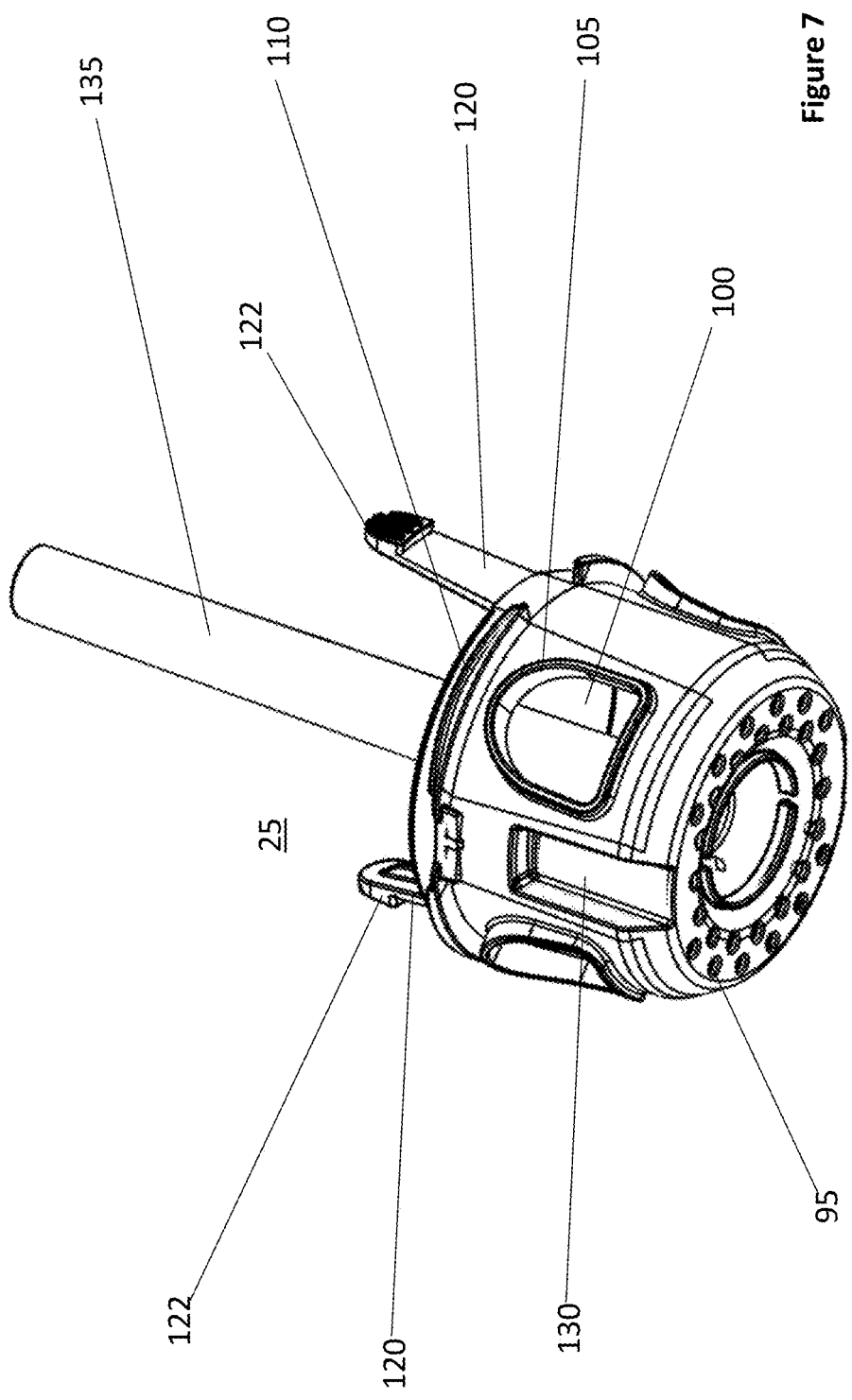
FIG. 7 is an underside perspective view of a seed tray of the improved bird feeder, according to an embodiment of the present disclosure.
Figure 8:
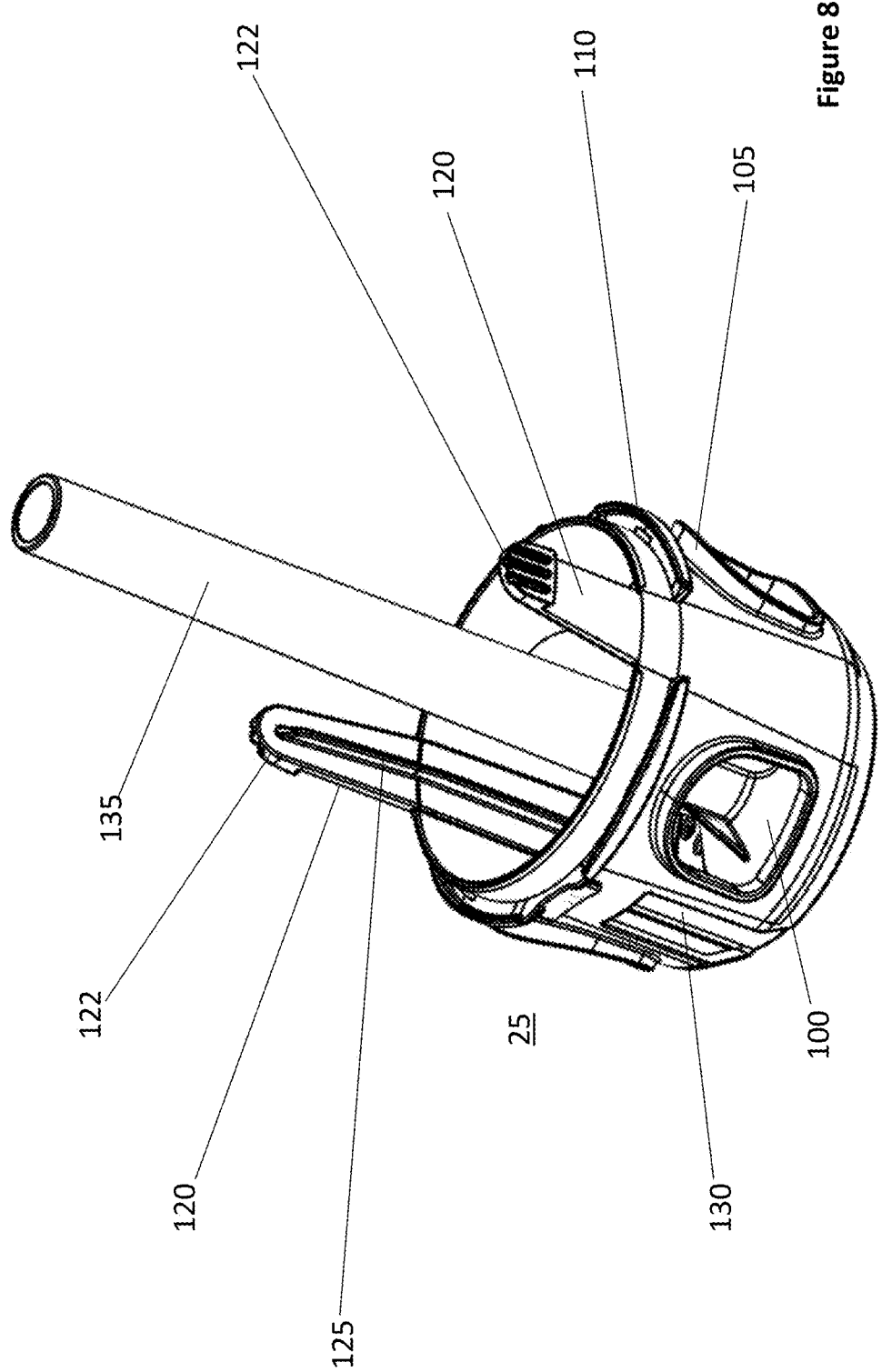
FIG. 8 is an upper perspective view of the seed tray of an improved bird feeder, according to an embodiment of the present disclosure.
Figure 9:
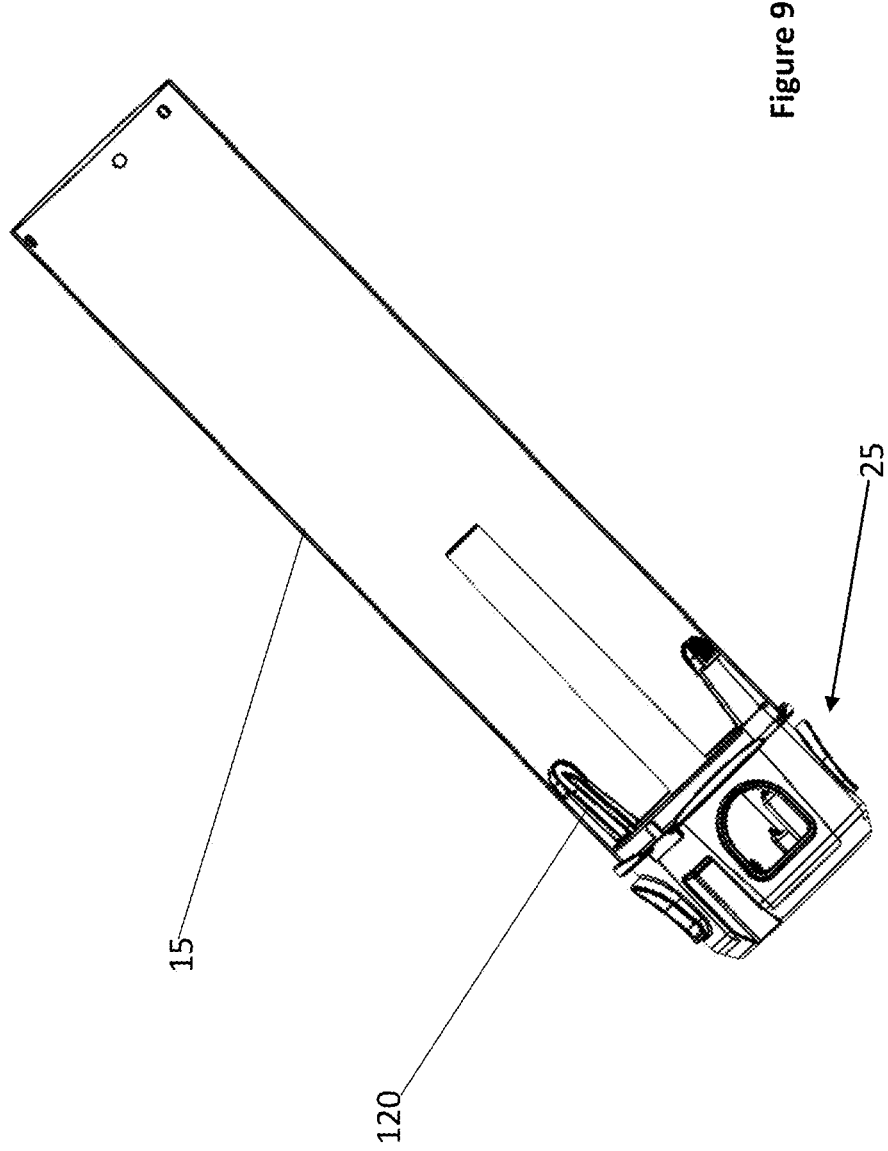
FIG. 9 is a perspective view of a seed tube connected to the seed tray of the improved bird feeder, according to an embodiment of the present disclosure.

With reference to FIGS. 7, 8 and 9, the seed tray 25 is shown in greater detail. The seed tray 25 is preferably bowl-shaped to contain a number of seeds that have been deposited therein through the seed tube 15. As the seed tray 25 is secured to the seed tube 15, seeds accumulate in both of the seed tray 25 and seed tube 15. Water holes 95 are positioned on an underside of the seed tray 25, such water holes 95 having an optimal size to allow water but prevent seeds from passing through. It is an object of the present disclosure that the seeds remain dry and therefore proper aeration and drainage within the bird feeder is required. The seed tray 25 is further comprised of at least one feed opening 100 to allow access to the feed within the seed tray 25. Although four feed openings 100 are provided, a worker skilled in the art would appreciate that a single feed opening 100 is possible, and that such single feed opening 100 could take other shapes and sizes, including a singular circumferential opening, provided that it provides access to the seeds in the seed tray 25. Each feed opening 100 has a protruding frame 105, the protruding frame 105 to repel and otherwise redirect water around the feed opening 100. Indeed, as water may cascade down on the face of the seed tray 25, the protruding frame 105 of the feed openings 100 reduces the likelihood that water goes into the feed openings 100 and come into contact with the seeds, which is undesirable. To even further reduce the likelihood of water going into the feed openings 100, troughs 110 are located on the front face of the seed tray 25, above the feed openings 100. As shown, these troughs 110 redirect water that cascades down from the seed tube 15 away from the feed openings 100, towards the side of such feed openings 100. The seed tray 25 is further comprised of a connector to connect to the seed tube 15. In this particular embodiment, the connector is a pair of outwardly tapered fingers 120, the fingers 120 terminating in undercut tabs 122 that lock into corresponding apertures (not shown) in the seed tube 15. The pair of fingers 120 project outwardly from the seed tray 25 to better mate with the apertures (not shown) of the seed tube 15. The tapering of the fingers 120 also increase the latching strength of the seed tray 25 to the seed tube 15 as the fingers 120 are biased outwardly and into the corresponding apertures (not shown) of the seed tube 15. As shown, the undercut tabs 122 have a tapered portion, which is preferably but not necessarily 15 degrees. Such tapering increases the force necessary to separate the seed tube 15 from the seed tray 25. In other words, the tapered portion strengthens the connection between the fingers 120 and the apertures (not shown) of the seed tube 15 so that the seed tray 25 is better retained within the seed tube 15. Each of the fingers 120 is also further comprised of a reinforcing rib 125 to structurally reinforce the fingers 120. The combination of fingers 120 and corresponding apertures (not shown) of the seed tube 15 provides an advantageous snap-fit solution to quickly and easily separate the seed tube 15 from the seed tray 25 for quick and easy cleaning. A worker skilled in the art would appreciate that although the connector in this embodiment is a pair of fingers 120 connected to apertures (not shown) of the seed tube 15, other connectors are possible provided that the seed tray 25 is releasably secured to the seed tube 15. The seed tray 25 is also further comprised of recessed axial openings 130 adapted to receive baffle tabs (not shown) of the baffle (not shown). The seed tray 25 is also comprised of a hollow post 135, the hollow post 135 housing a spring positioning mechanism (not shown) to be further described below.

Figure 10:
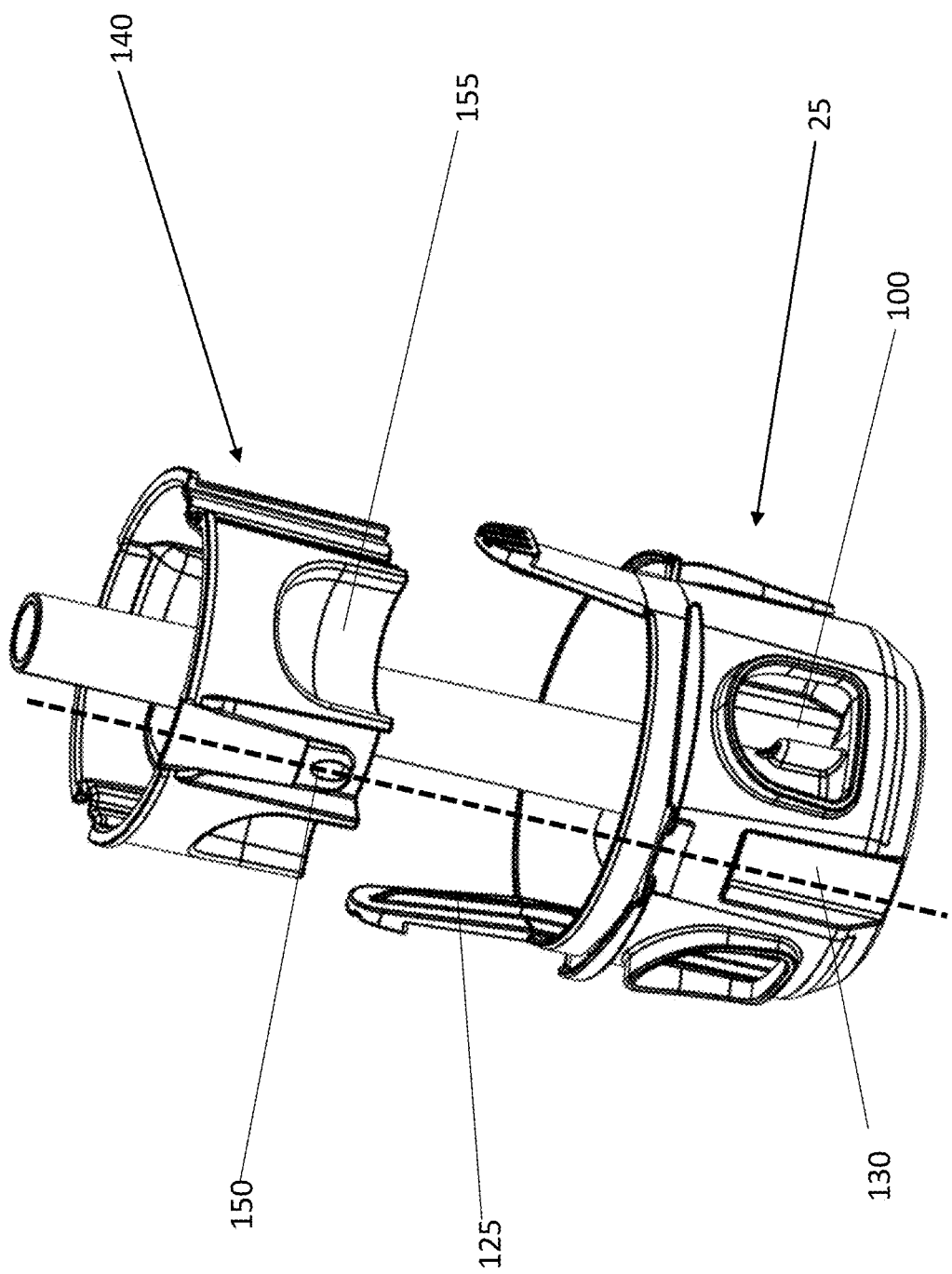
FIG. 10 is an exploded view of a baffle and the seed tray of the improved bird feeder, according to an embodiment of the present disclosure.
Figure 11:
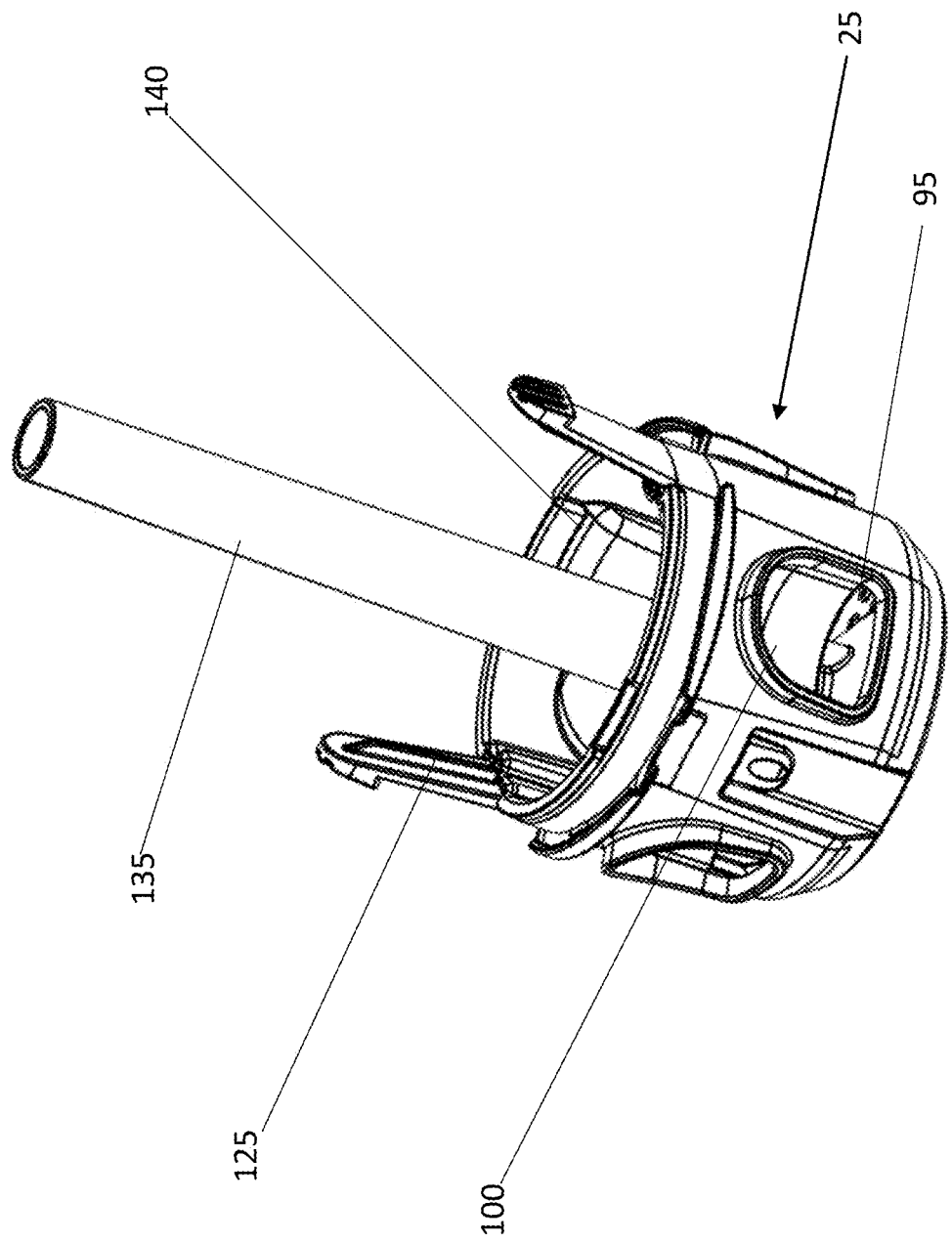
FIG. 11 is a perspective view of the baffle releasably secured to the seed tray of the improved bird feeder, according to an embodiment of the present disclosure.
Figure 12:
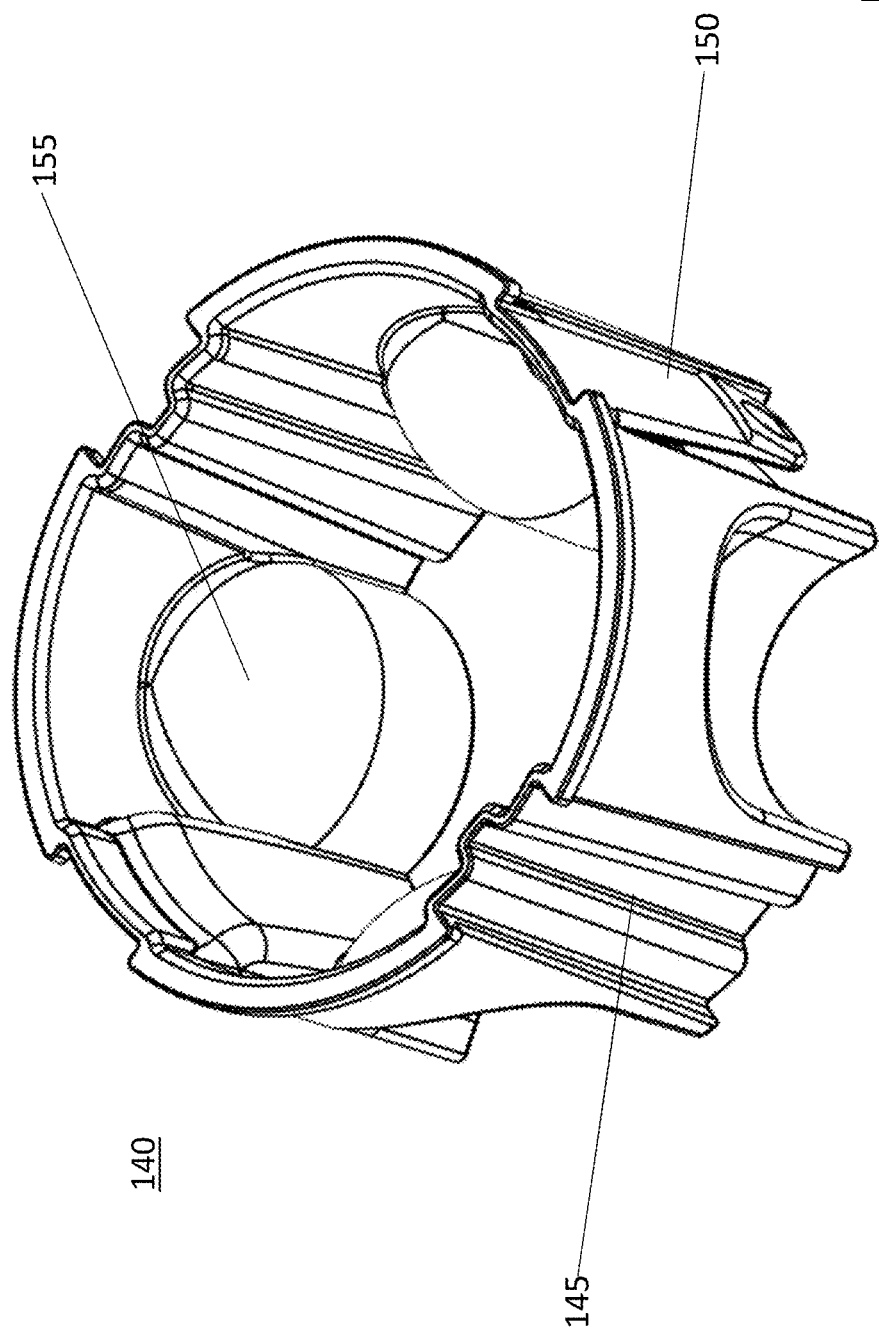
FIG. 12 is an upper perspective view of the baffle of the improved bird feeder, according to an embodiment of the present disclosure.

With reference to FIGS. 10, 11 and 12 and according to an embodiment of the present disclosure, a baffle 140 is shown releasably secured to seed tray 25. As shown, the baffle 140 is designed having a shape to only allow a specific orientation of the baffle 140 relative to the seed tray 25. A worker skilled in the art would appreciate that the baffle 140 can be a symmetrical or non-symmetrical shape, provided that such shape only allows a specific, desired configuration of the baffle 140 within the seed tray 25. The baffle 140 is comprised of two inner axial guides 145 that generally correspond to the shape and size of the pair of fingers 120 and the reinforcing ribs 125 of the seed tray 25. The guides 145, which are recessed, will slide along the length of the fingers 120 of the seed tray 25 to properly position the baffle 140 therein. The baffle 140 is further comprised of baffle locking tabs 150, which align with the recessed axial openings 130 of the seed tray 25 and lock therein as specifically shown by the dotted line in FIG. 10. The baffle 140 is further comprised of cavities 155, such cavities 155 to be aligned with feed openings 100 of the seed tray 25 when the baffle 140 is secured to the seed tray 25. The cavities 155 are dome-shaped to prevent all of the bird seed from flowing out of the feed openings 100 by only allowing bird seed to accumulate at the bottom of the seed tray 25, directly above the water holes 95. The removeable baffle 140 is advantageous over the prior art as it allows for easy cleaning of the seed tray 25, which is necessary to remove older seeds or clear the seed tray 25 of unwanted debris or dirt. A worker skilled in the art would appreciate that the baffle 140 is preferably designed with cavities 155 corresponding to the feed openings 100 of the seed tray 25.

Figure 13:
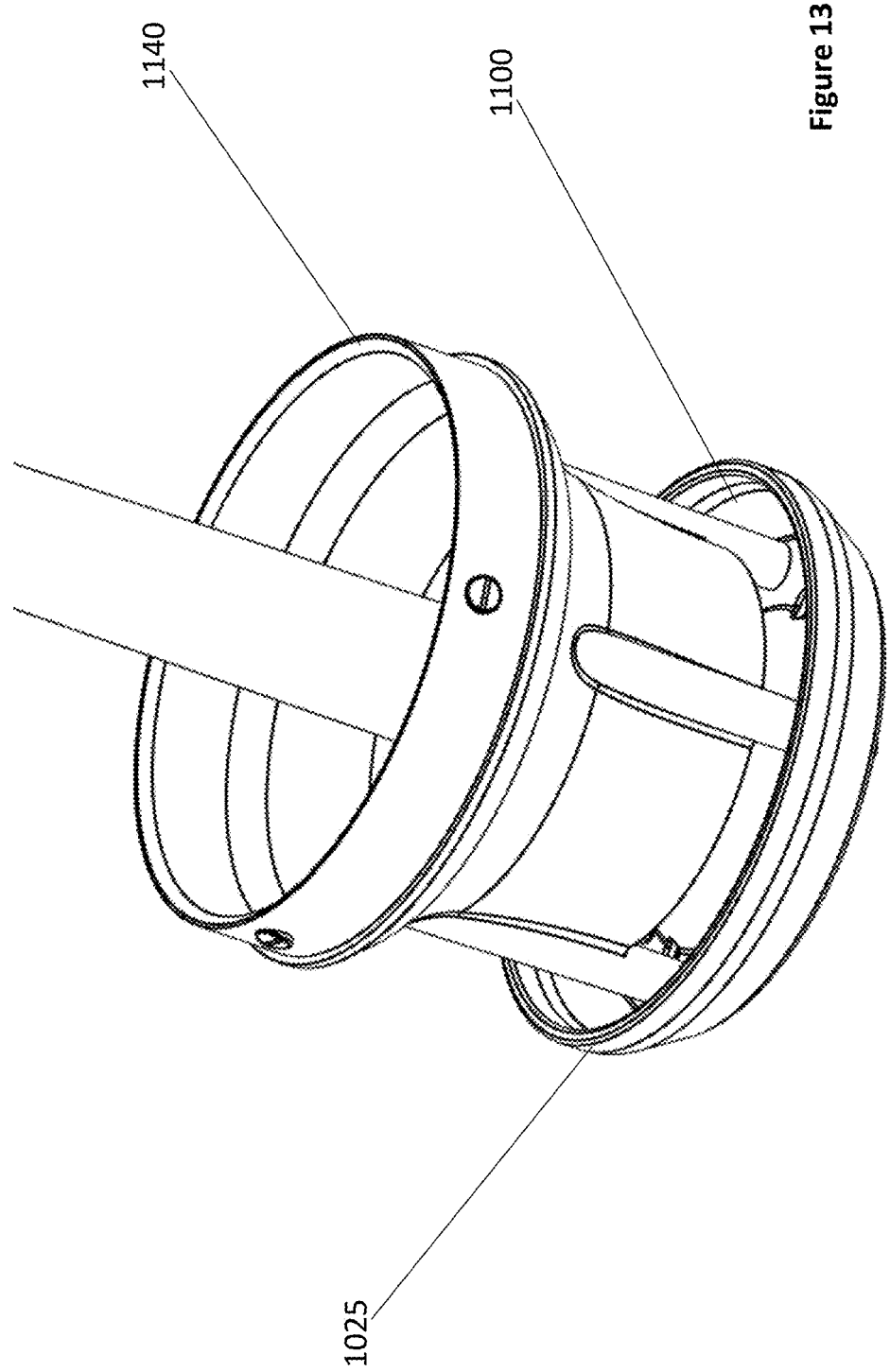
FIG. 13 is a perspective view of a baffle secured to a seed tray according to another embodiment of the present disclosure.

With reference to FIG. 13 and according to another embodiment of the present disclosure, a seed tray 1025 is shown connected to a baffle 1140. In this alternate embodiment, a singular, circumferential feed opening 1100 is shown. As was earlier described, a multitude of shapes and sizes of the feed openings 1100 are captured by the present disclosure, as long as they provide access to the bird feed.

Figure 14:
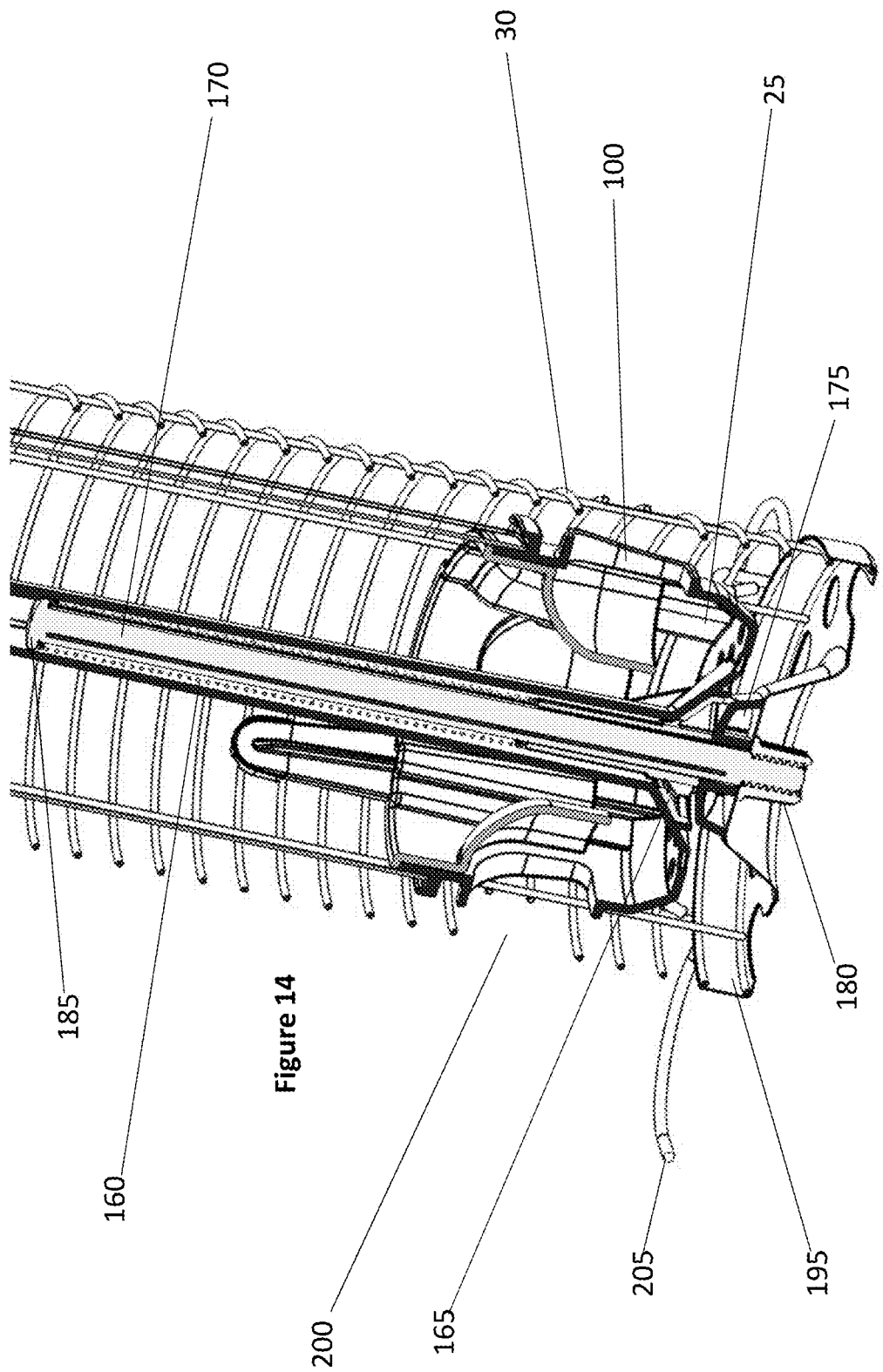
FIG. 14 is a perspective cross-sectional view of the positioning mechanism in a second position within the seed tray and shroud of the improved bird feeder, whereby the feed openings are not aligned with the shroud openings, according to an embodiment of the present disclosure.
Figure 15:
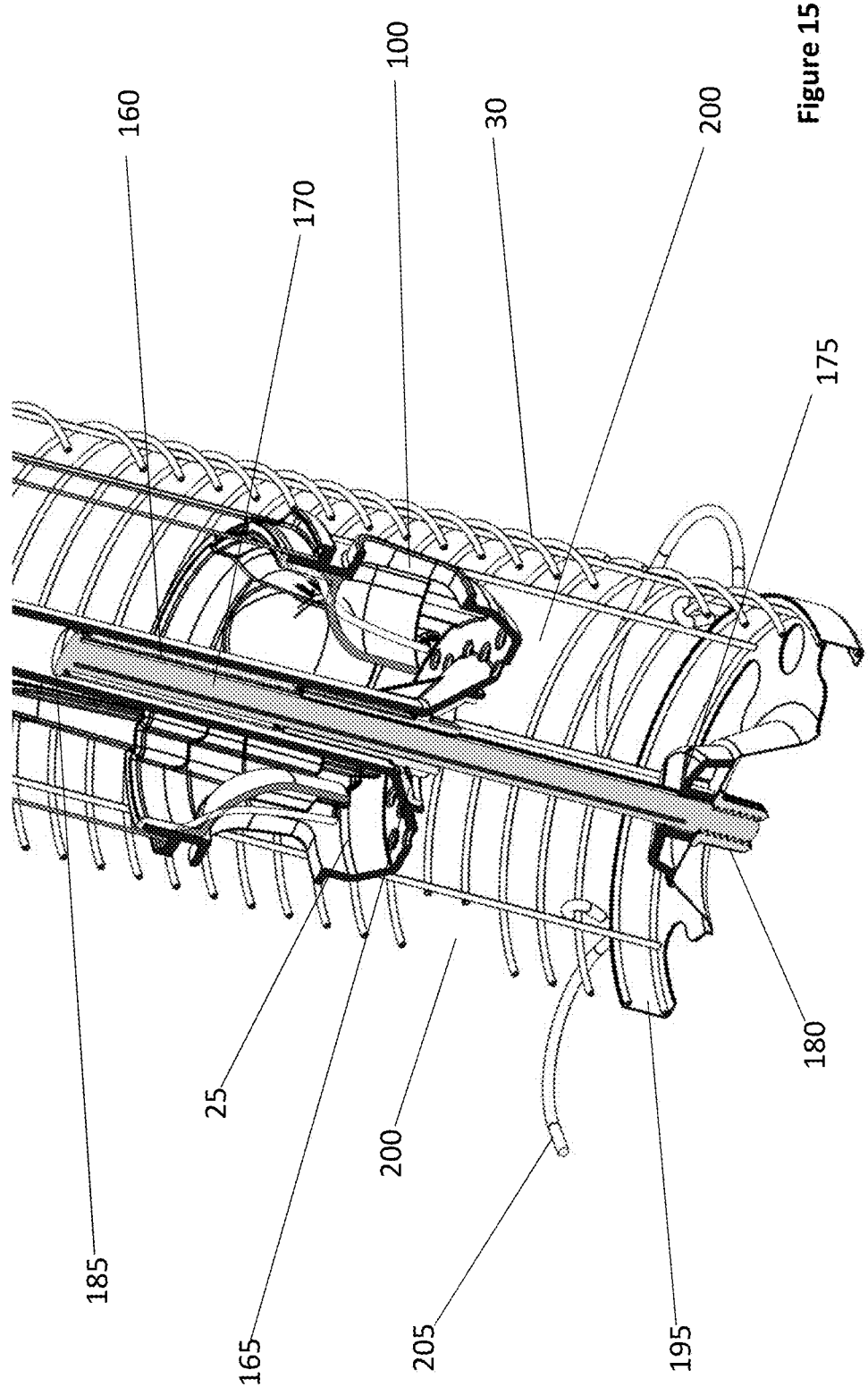
FIG. 15 is a perspective cross-sectional view of the positioning mechanism in a first position within the seed tray and shroud of the improved bird feeder, whereby the feed openings are aligned with the shroud openings, according to an embodiment of the present disclosure.
Figure 16:
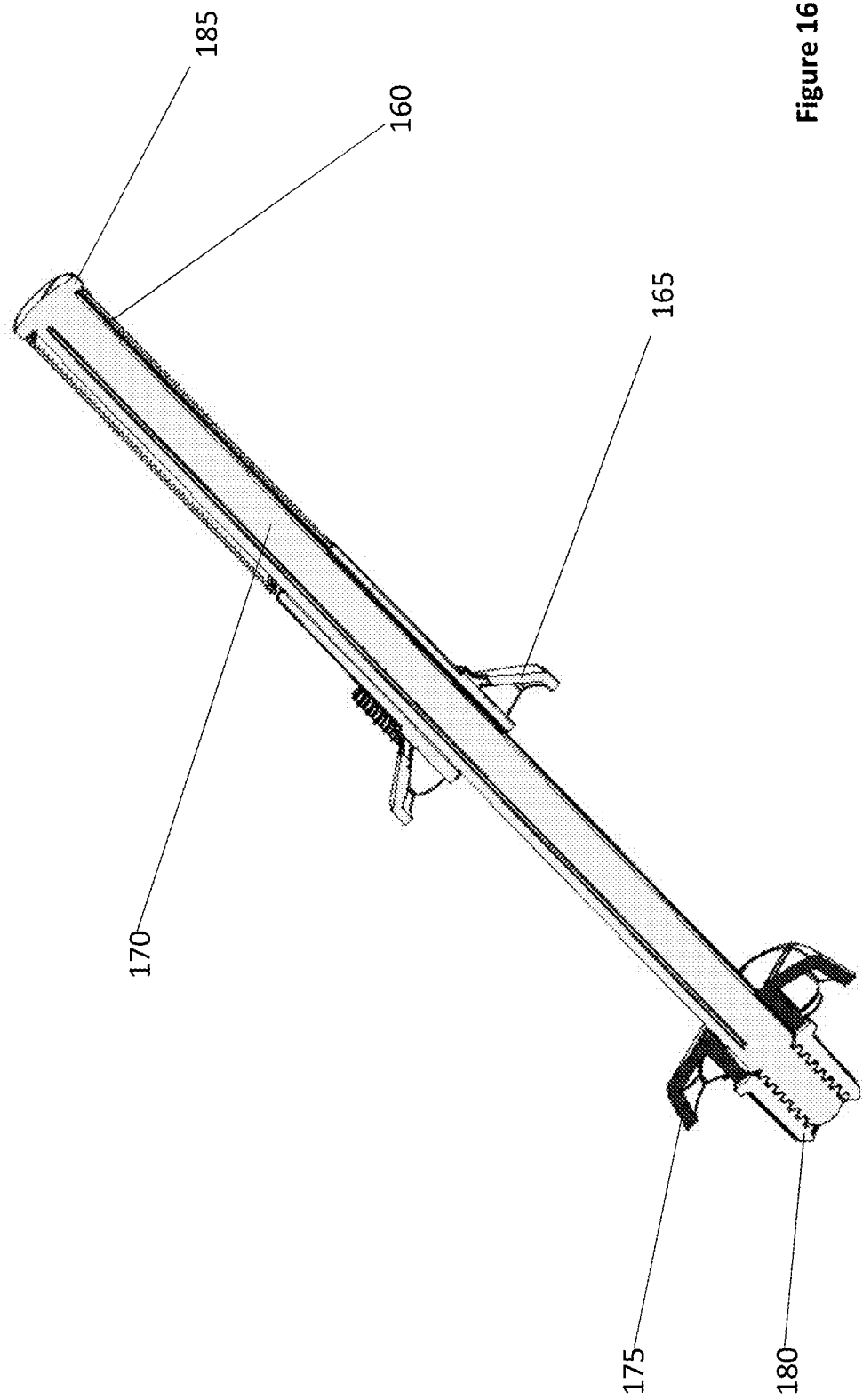
FIG. 16 is a perspective cross-sectional view of the positioning mechanism of the improved bird feeder, according to an embodiment of the present disclosure.
Figure 17:
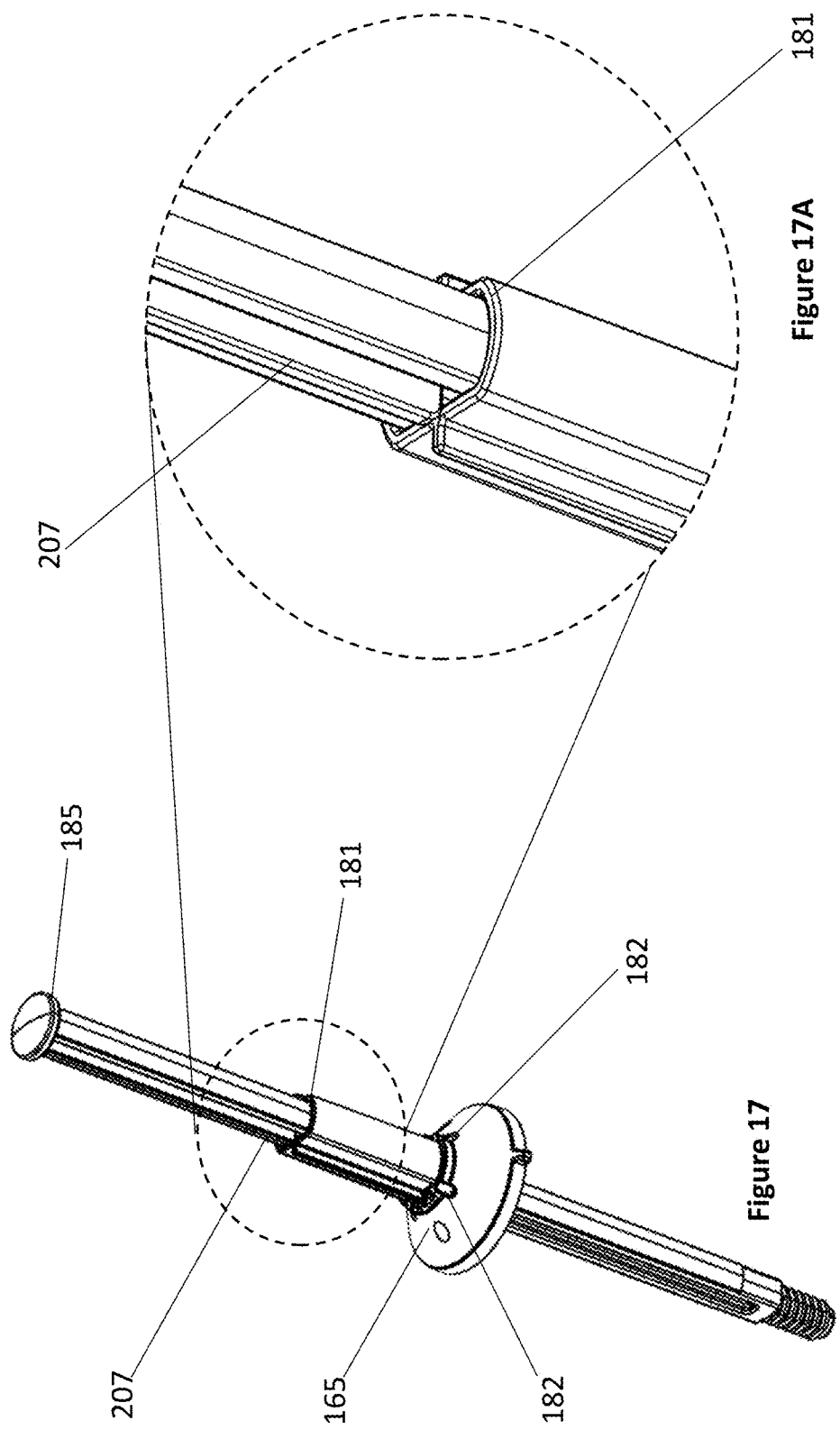
FIG. 17 is a perspective view of the rod and spring cap of the improved bird feeder, according to an embodiment of the present disclosure.
Figure 18:
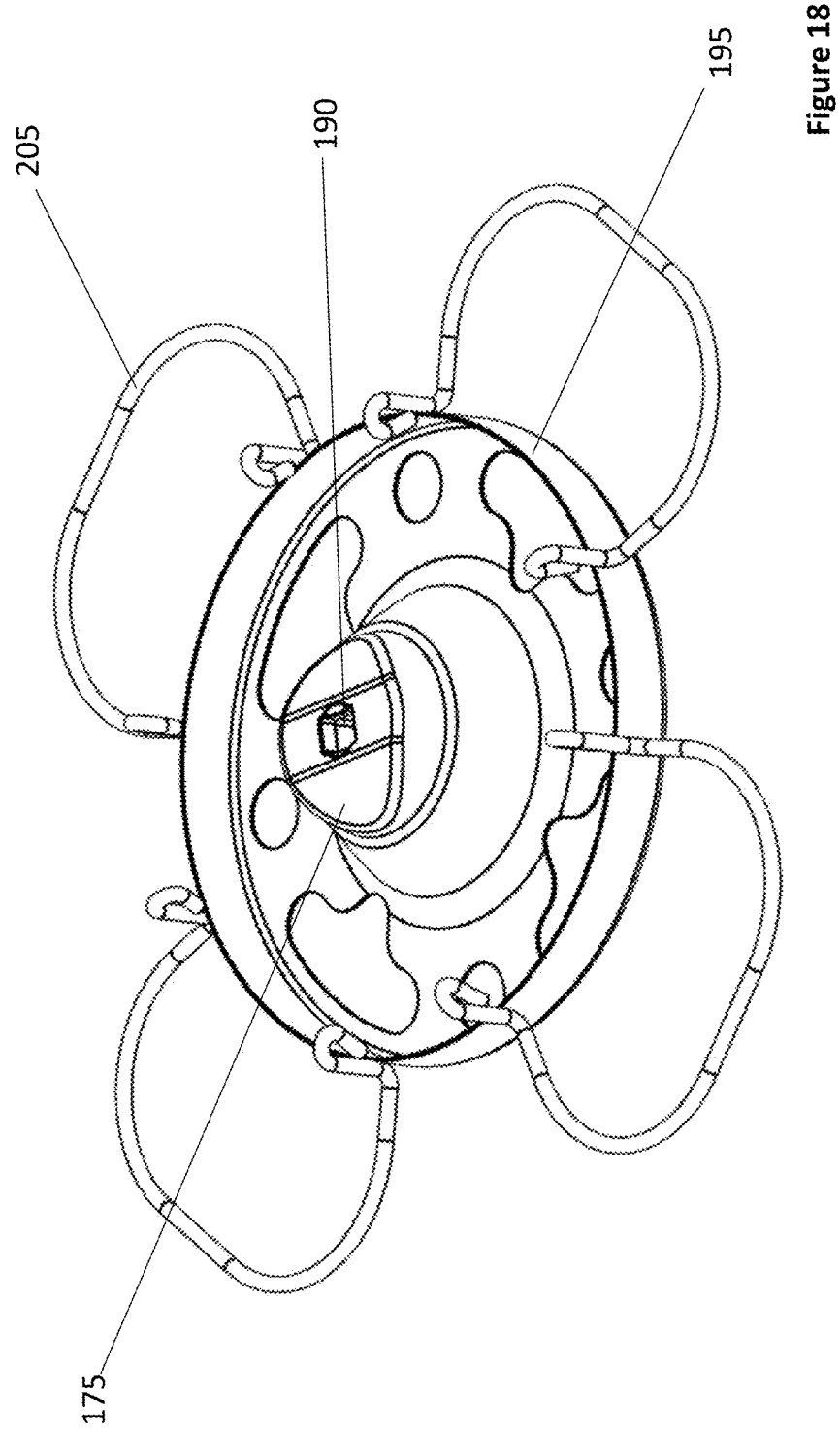
FIG. 18 is a perspective view of a shroud base having perches of the improved bird feeder, according to an embodiment of the present disclosure.
Figure 19:
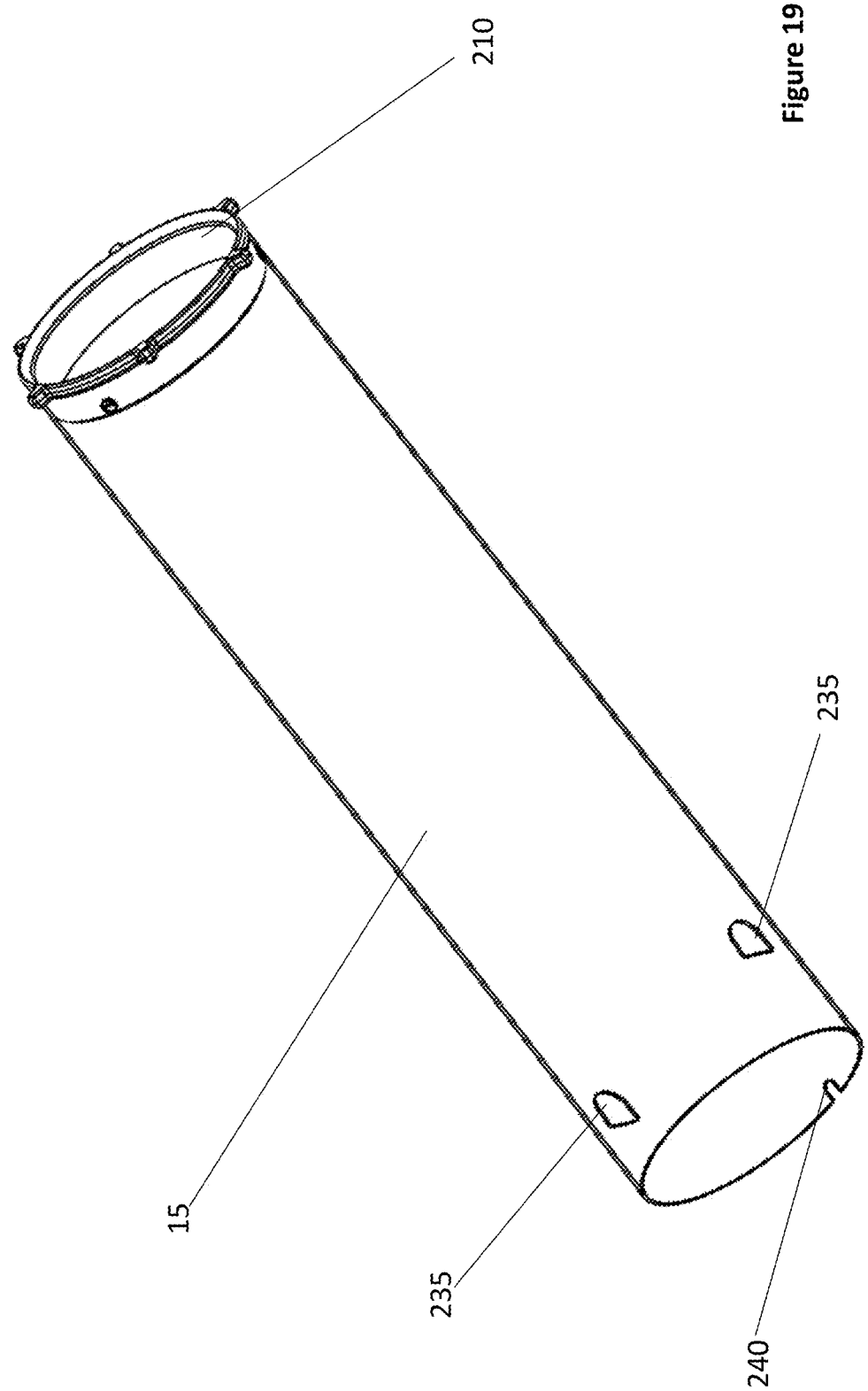
FIG. 19 is a perspective view of the seed tube having an upper band of the improved bird feeder, according to an embodiment of the present disclosure.
Figure 20:
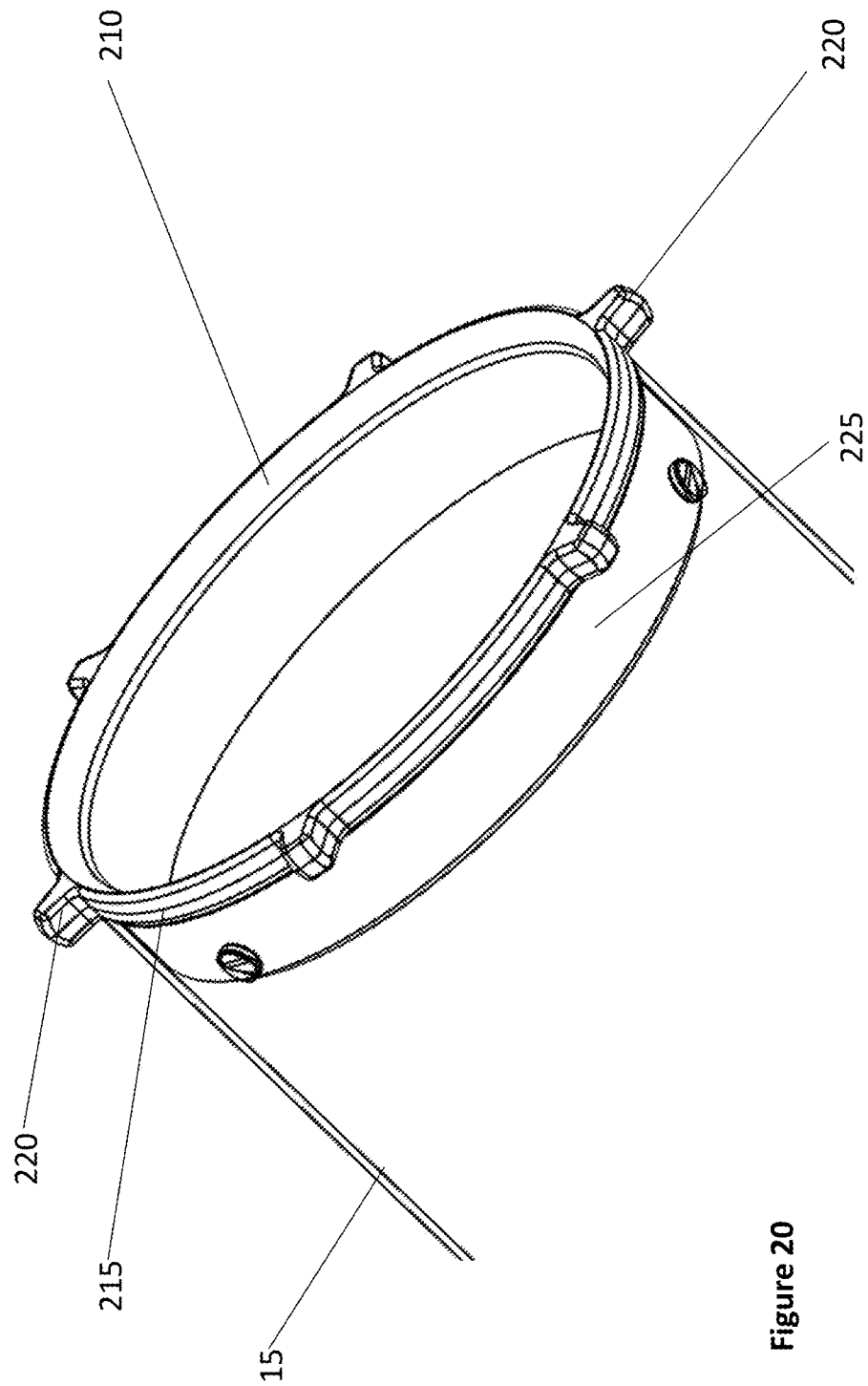
FIG. 20 is an enlarged perspective view of the seed tube with the upper band of the improved bird feeder, according to an embodiment of the present disclosure.
Figure 21:
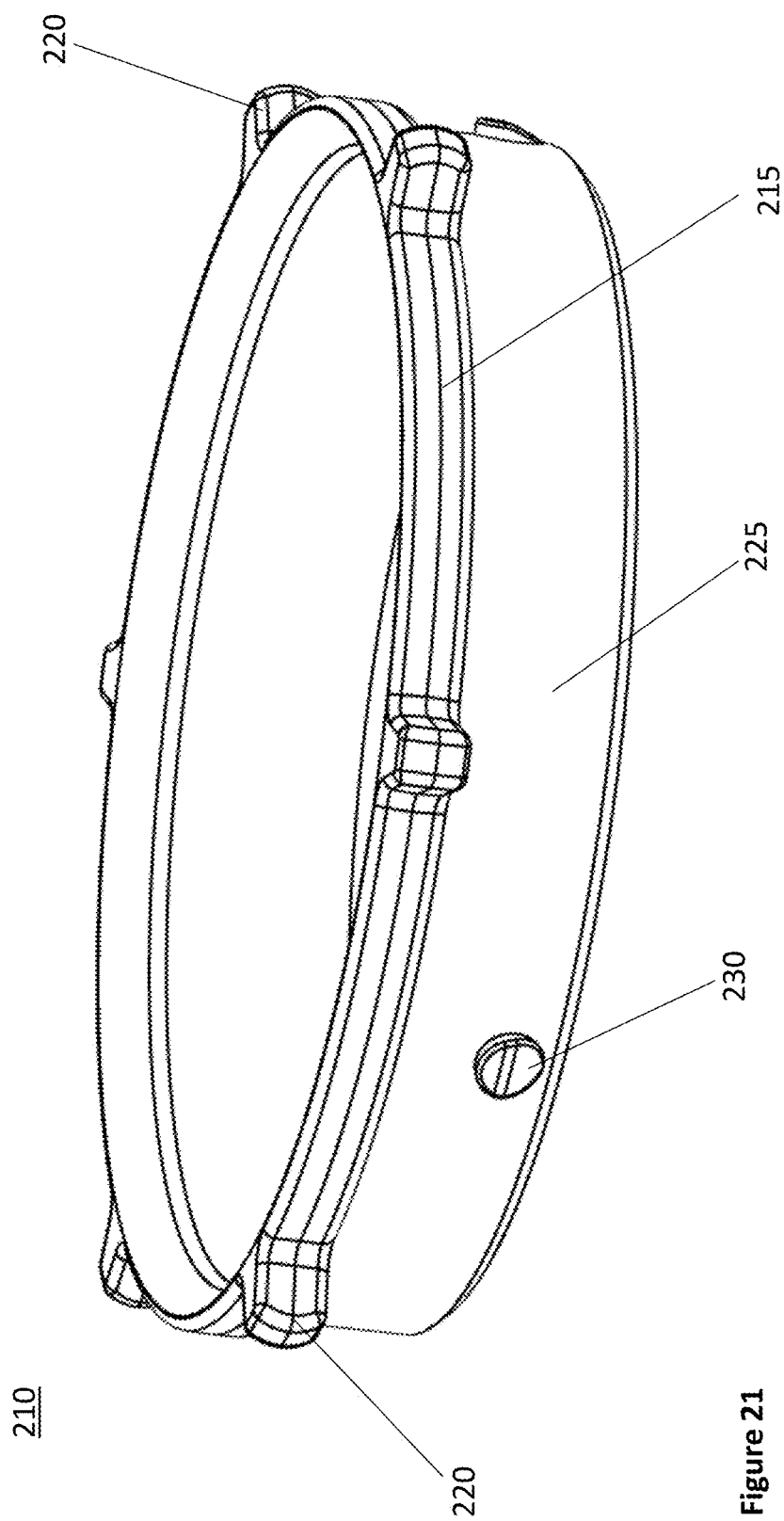
FIG. 21 is a perspective view of the upper band of the improved bird feeder, according to an embodiment of the present disclosure.

With reference to FIGS. 14, 15, 16, 17, 17A and 18 and according to an embodiment of the present disclosure, the positioning mechanism is shown in greater detail. As will be described further below, the positioning mechanism allows for the bird feeder to move from a first position as specifically shown in FIG. 14, to a second position as specifically shown in FIG. 15, and back again. The first position provides access to the feed openings 100 and the second position prevents access to the feed openings 100. Preferably, the positioning mechanism is comprised of a spring 160, a spring cap 165 and a central rod 170 fitted through a shroud rotation lock 175 and in threaded engagement with a nut 180. The spring 160 is shown trapped in between the upper edge 181 of the spring cap 165 and a lip 185 of the rod 170. The spring cap 165 is attached to the seed tray 25 by screws, although a worker skilled in the art would appreciate that the seed tray 25 can be attached to the spring cap 165 by other means, provided that seed tray 25 cannot move independently from the spring cap 165. The spring cap 165 is further comprised of at least one drainage and ventilation hole 182 to allow water to drain out of the positioning mechanism or for air to circulate the positioning mechanism and keep it dry. The rod 170 is preferably of a non-circular shape to ensure that the rod 170 does not rotate independently from the spring cap 165 and the shroud rotation lock 175 and is only positioned in a particular, desired orientation relative to the spring cap 165 and the shroud rotation lock 175. Specifically, the upper end of the rod 170 is fitted through a corresponding non-circular opening (not shown) of the spring cap 165, while the lower end of the rod 170 is fitted through a corresponding non-circular index slot 190 of both the shroud rotation lock 175 and the shroud base 195. A worker skilled in the art would appreciate that although the index slot 190 is shown as a separate part, the index slot 190 could be prefabricated as a singular piece that forms part of the shroud 30. As aforementioned, the corresponding non-circular shape of the rod 170, the opening (not shown) of the spring cap 165 and the index slot 190 ensures that the rod 170 can only be positioned in one or more specific orientations relative to the shroud 30 and the seed tray 25. Such a specific orientation provides for the alignment between the feed openings 100 of the seed tray 25 and corresponding shroud openings 200, which shall be further described below. The central rod 170 is fitted through the spring cap 165 and the central rod 170 acts as a piston within the spring cap 165. In other words, when a downward force is applied to the rod 170, the lip 185 of the rod 170 actuates and compresses the spring 160 in between the lip 185 and the upper edge 181 of the spring cap 165 as specifically shown in FIG. 16. When the bird feeder is in a first position at rest as shown in FIG. 14, the feed openings 100 are aligned with shroud openings 200 to provide access to the feed. In this first position, the spring 160 is in a generally elongated position generally at rest. Although birds may sit on the perches 205, such light weight of the birds will not be sufficient to overcome the compression strength of the spring 160 and therefore the bird feeder will remain in its first position. However, unwanted squirrels or other heavier animals may also grab onto the shroud 30, shroud base 195 or perches 205 to access the feed. In such instances, the weight of these heavier animals will overcome the compression strength of the spring 160 and force the shroud 30 toward the ground as specifically shown in FIG. 15. In doing so, the shroud 30, attached to the rod 170 via nut 180 as described above, will pull downwardly on the rod 170. In turn, the rod 170 will compress spring 160 until the upper edge 181 of the spring cap 165 comes into contact with a flange 207 of the rod 170 as best shown in FIGS. 17 and 17A. Such contact between the upper edge 181 of the spring cap 165 and the flange 207 of the rod 170 acts as a stop to prevent further compression of the spring 160. Upon such contact, the feed openings 100 of the seed tray 25 are no longer aligned with shroud openings 200 of the shroud 30, as specifically shown in FIG. 15. This is described herein as the second position of the bird feeder, whereby access to feed openings 100 is prevented. As the shroud openings 200 are no longer aligned with the feed openings 100, the squirrels will no longer have access to the feed within the seed tray 25.

Figure 22:
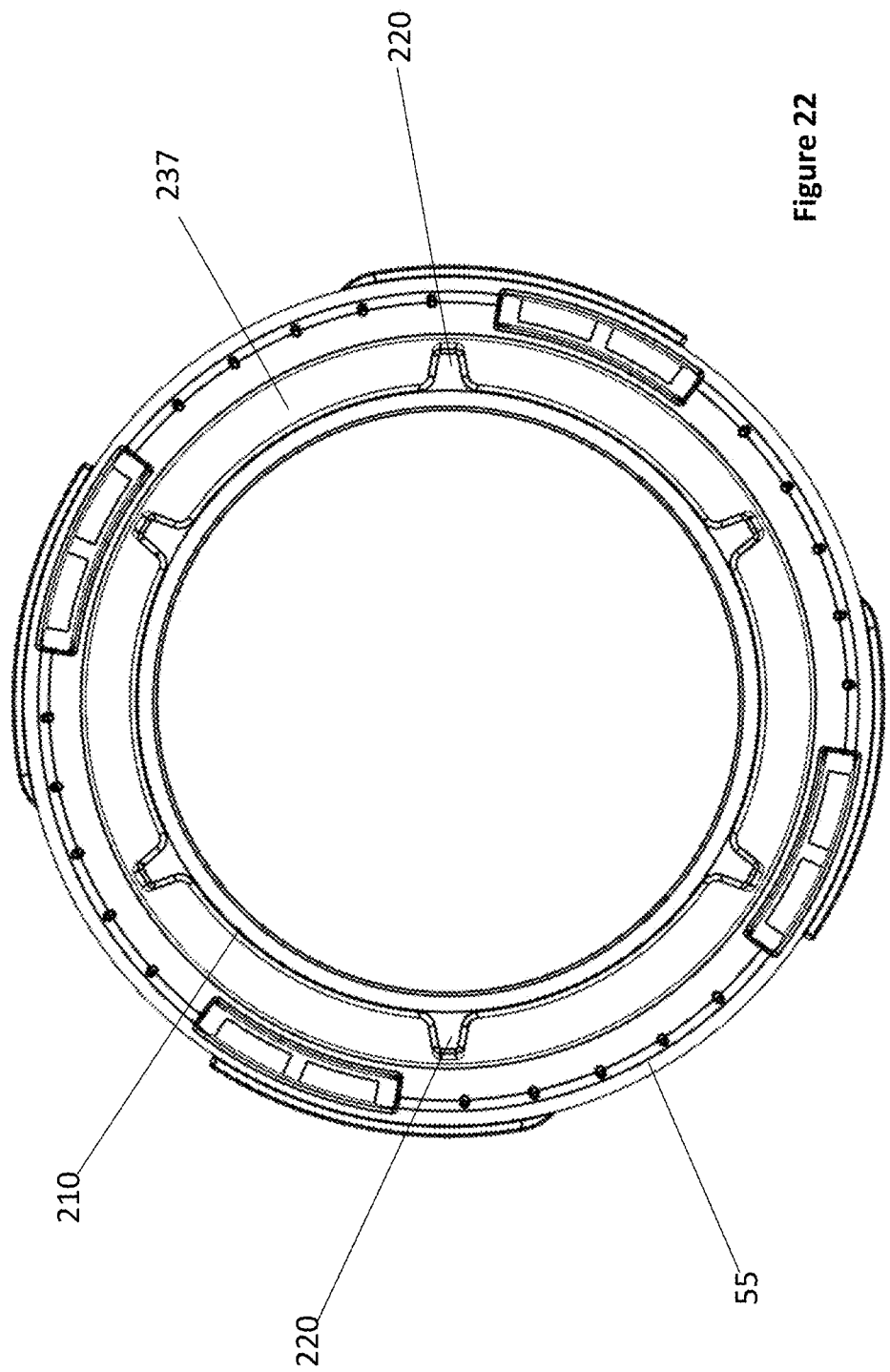
FIG. 22 is a top view of the upper band within the top ring of the improved bird feeder, according to an embodiment of the present disclosure.

With reference to FIGS. 19, 20, 21 and 22 and according to an embodiment of the present disclosure, a seed tube 15 is shown having an upper band 210 fitted thereon. The upper band 210 is further comprised of a protruding circumferential upper rim 215 having a plurality of protrusions 220. A recessed circumferential portion 225 is also provided, positioned below the upper rim 215, the recessed portion 225 having locking extensions 230. These locking extensions 230 have a sloped front surface to facilitate locking into corresponding slots of the seed tube 15. The recessed circumferential portion 225 is fitted flushly within the seed tube 15 and the locking extensions 230 are aligned with the slots in the seed tube 15. Once the upper band 210 is locked within the seed tube 15, the upper rim 215 sits flush on the upper peripheral portion of the seed tube 15. The protrusions 220 project outwardly from the seed tube 15 and are positioned proximate an inner wall of the top ring 55 when the bird feeder is assembled. Advantageously, the protrusions 220 provide additional strength to the upper portion of the seed tube 15, and the proximity of the protrusions 220 to the inner wall of the top ring 55 as best shown in FIG. 22 serves to center the seed tube 15 within the shroud (not shown) and reduces or prevents the seed tube 15 from pivoting or otherwise swaying in the shroud (not shown). The protrusions 220, sitting flushly against the inner wall of the top ring 55, further create spaces 237 for excess seeds to fall therein, rather than be stuck if the seed tube 15 was in close contact with the top ring 55. As shown, the seed tube 15 is also comprised of a pair of apertures 235 to engage with a pair of fingers (not shown) of the seed tray (not shown). An alignment notch 240 is also provided at the base of the seed tube 15 to properly align the seed tube 15 to the seed tray (not shown). The combination of apertures 235 with the notch 240 provide for each installation of the seed tube 15 to the seed tray (not shown), which in turn makes for easy assembly and disassembly and therefore provides for easy cleaning.

Figure 23B:
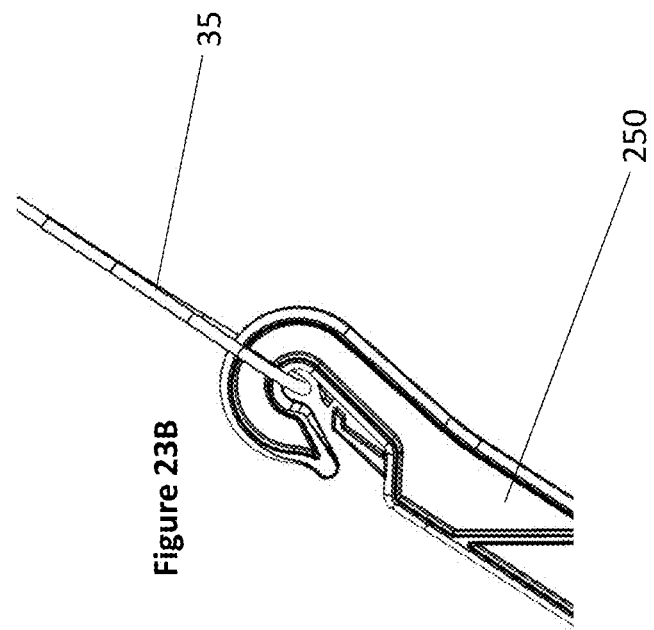
FIG. 23 is a perspective cross-sectional view of the seed tray secured to the hook shaft of the improved bird feeder, according to an embodiment of the present disclosure.
FIG. 23A is an enlarged view of the hook shaft secured to the hollow post of the seed tray taken within the lines in FIG. 18, according to an embodiment of the present disclosure; and, FIG. 23B is an enlarged view of the wire looped into the hook shaft taken within the lines in FIG. 18, according to an embodiment of the present disclosure.
Figure 23A:
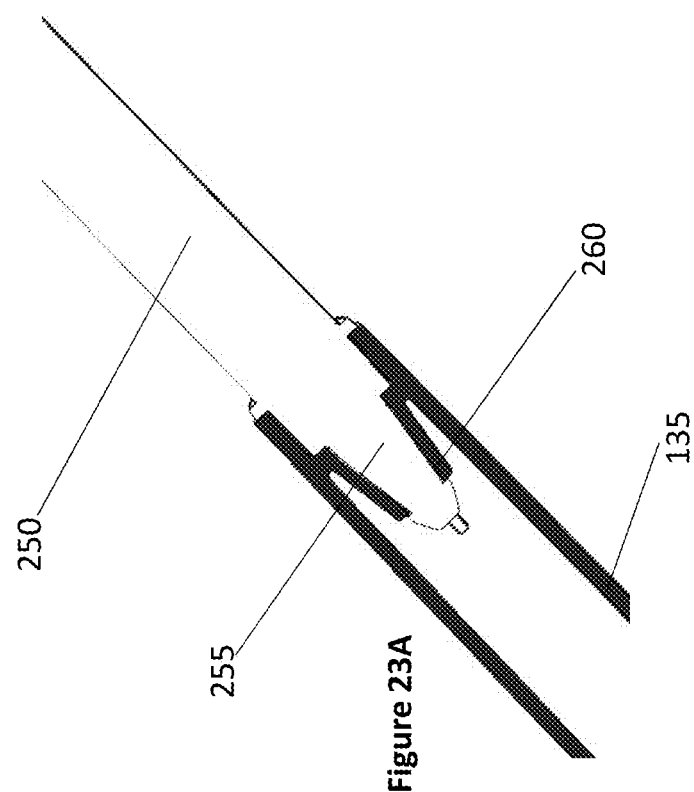

With reference to FIGS. 23, 23A and 23B, a hook shaft 250 is shown connected to the hollow post 135 of the seed tray 25 and to the wire 35. It is an object of the present disclosure that the hook shaft 250 rotate independently relative to the bird feeder, and specifically to the hollow post 135. Indeed, wind and other elements may cause the bird feeder to rotate, which will in turn cause the wire 35 to rotate on itself. As the wire 35 is secured to the hook shaft 250 as specifically shown in FIG. 23B, it is desirable for the wire 35 and the hook shaft 250 to rotate independently of the bird feeder so as to not stress the wire 35 or hook shaft 250. As best shown in FIG. 23A, the hook shaft 250 has an arrow-shaped lower end 255 that snap fits into a retention member 260 of the hollow shaft 135. This structural relationship allows for rotation of the hollow post 135 independently from the hook shaft 250. A worker skilled in the art would appreciate that there are other ways to secure the hollow post 135 to the hook shaft 250 while allowing independent rotational movement, including but without limitation to ball bearings.

Many modifications of the embodiments described herein as well as other embodiments may be evident to a person skilled in the art having the benefit of the teachings presented in the foregoing description and associated drawings. It is understood that these modifications and additional embodiments are captured within the scope of the contemplated disclosure which is not to be limited to the specific embodiment disclosed.

The invention claimed is:

1. A bird feeder comprising:
 a seed tube for holding bird feed;
 a seed tray connected to the seed tube, the seed tray for receiving and dispensing the bird feed, the seed tray further comprising at least one feed opening to dispense the bird feed;
 a shroud surrounding the seed tube to protect the seed tube;
 a cover releasably secured to an upper end of the shroud, the cover to prevent objects from entering the seed tube; and,
 a positioning mechanism comprising:
  a rod having a lip;
  a spring cap; and
  a spring surrounding the rod, the spring being compressible between the spring cap and the lip of the rod;
 wherein the positioning mechanism allows the shroud to move from a first position providing access to the at least one feed opening to a second position preventing access to the at least one feed opening.

2. The bird feeder of claim 1 wherein the rod is further comprised of:
 an upper end having a flange acting as a stop against the spring cap; and,
 a lower end having threads to lock into a nut,
 wherein the lip is positioned at the upper end of the rod.

3. The bird feeder of claim 1 further comprising an upper ring removably secured to the shroud.

4. The bird feeder of claim 3 wherein the upper ring is further comprised of at least two upper ring tabs configured to be secured on the shroud.

5. The birder feeder of claim 3 wherein the cover is further comprised of at least two indentations and the upper ring is further comprised of at least two guides to direct the at least two indentations.

6. The bird feeder of claim 5 wherein the upper ring is further comprised of locking tabs in which to trap the at least two indentations.

7. The bird feeder of claim 1 wherein the seed tray is further comprised of holes on an underside of the seed tray, the holes to increase water drainage.

8. The bird feeder of claim 1 wherein the seed tray is further comprised of a connector to connect to the seed tube.

9. The bird feeder of claim 8 wherein the connector is further comprised of two fingers terminating in undercut tabs.

10. The bird feeder of claim 9 wherein the two fingers are further comprised of a reinforcing rib.

11. The bird feeder of claim 1 further comprising a baffle removably secured to the seed tray.

12. The bird feeder of claim 11 wherein the baffle is further comprised of baffle tabs and wherein the seed tray is further comprised of openings adapted to receive the baffle tabs.

13. The bird feeder of claim 11 wherein the baffle is further comprised of axial guides.

14. The bird feeder of claim 1 further comprising an upper band secured to the seed tube.

15. The bird feeder of claim 14 wherein the upper band is further comprised of a plurality of protrusions projecting outwardly from the seed tube to provide additional strength to an upper portion of the seed tube.

16. The bird feeder of claim 1 further comprised of a central shaft attached to the seed tray.

17. The bird feeder of claim 16 wherein the shaft is further comprised of a lower end secured to a retention member of the seed tray to allow the shaft to rotate independently from the seed tray.

18. The bird feeder of claim 1 wherein the seed tray is further comprised of troughs, the troughs to redirect water away from the at least one feed opening.

19. The bird feeder of claim 1, wherein the spring cap is comprised of a spring cap opening, the spring cap opening having a non-uniform shape configured to receive a lower end of the rod, the non-uniform shape of the spring cap opening to prevent independent rotation of the rod relative to the spring cap.

20. The bird feeder of claim 19 wherein the shroud is further comprised of an index slot, the index slot configured to receive the lower end of the rod.

* * * * *